United States Patent
Akada

(10) Patent No.: US 9,389,242 B2
(45) Date of Patent: Jul. 12, 2016

(54) METHOD FOR OBTAINING DATA OF SUBSTRATE PROCESSING APPARATUS AND SENSOR SUBSTRATE

(71) Applicant: TOKYO ELECTRON LIMITED, Tokyo (JP)

(72) Inventor: Hikaru Akada, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 623 days.

(21) Appl. No.: 13/923,501

(22) Filed: Jun. 21, 2013

(65) Prior Publication Data

US 2013/0346018 A1 Dec. 26, 2013

(30) Foreign Application Priority Data

Jun. 22, 2012 (JP) .................................. 2012-141247

(51) Int. Cl.
  *G01P 5/00* (2006.01)
  *G01P 13/00* (2006.01)

(52) U.S. Cl.
  CPC ............... *G01P 13/0006* (2013.01); *G01P 5/00* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,885,937 | A * | 12/1989 | Tanaka et al. | 73/170.12 |
| 6,502,459 | B1 * | 1/2003 | Bonne et al. | 73/170.11 |
| 8,326,559 | B2 * | 12/2012 | Fukuoka | 702/81 |
| 9,136,150 | B2 * | 9/2015 | Hayashi et al. | |
| 9,268,739 | B2 * | 2/2016 | Akada | G06F 17/00 |
| 2012/0084059 | A1 * | 4/2012 | Akada | 702/188 |
| 2013/0202388 | A1 * | 8/2013 | Hayashi et al. | 414/222.02 |

FOREIGN PATENT DOCUMENTS

| | | | |
|---|---|---|---|
| JP | 06265564 | A | 9/1994 |
| JP | 2003-106883 | A | 4/2003 |
| JP | 2004507753 | A | 11/2004 |
| JP | 2007317705 | A | 12/2007 |

* cited by examiner

*Primary Examiner* — Huan Tran
(74) *Attorney, Agent, or Firm* — Nath, Goldberg & Meyer; Jerald L. Meyer

(57) ABSTRACT

According to an embodiment of the present invention, a data obtainment method for obtaining data on gas flow directions in a plurality of measurement regions in a surface of a substrate loaded onto a loading unit of a substrate processing apparatus is provided. The method includes loading a sensor substrate onto the loading unit in a first direction, and changing the first direction into a second direction. Further, it is obtained a vector data of a gas flow in a first straight direction and a vector data of a gas flow in a second straight direction from each first sensor of the sensor substrate loaded in the first and second directions. Also, the method includes calculating a gas flow direction at each starting point in the first and second measurement regions by combining the vector data.

19 Claims, 25 Drawing Sheets

56A

FIG. 18
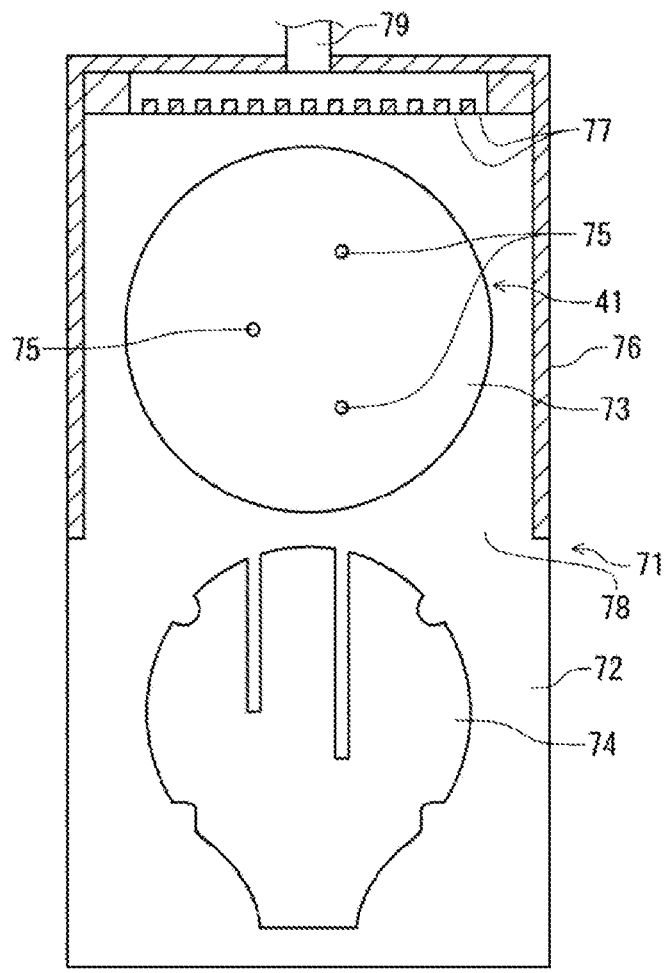
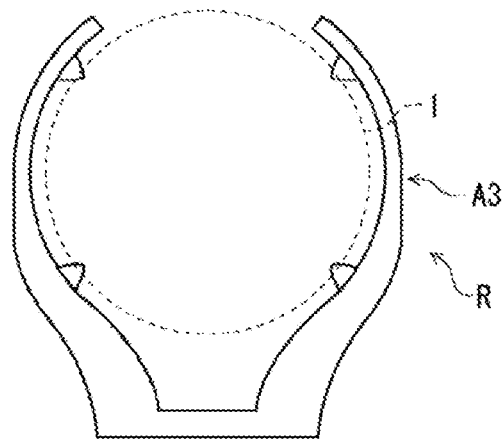

METHOD FOR OBTAINING DATA OF SUBSTRATE PROCESSING APPARATUS AND SENSOR SUBSTRATE

CROSS-REFERENCE TO RELATED APPLICATION

This application claims the benefit of Japanese Patent Application No. 2012-141247, filed on Jun. 22, 2012, in the Japan Patent Office, the disclosure of which is incorporated herein in its entirety by reference.

TECHNICAL FIELD

The present invention relates to a method for obtaining data of a substrate processing apparatus having a plurality of modules, and a sensor substrate used for the method.

BACKGROUND

In a photoresist process, which a type of semiconductor manufacturing process, a resist is applied to a surface of a semiconductor wafer (hereinafter, referred to as a "wafer") that serves as a substrate, and the formed resist film is exposed in a predetermined pattern and then developed, thereby forming a resist pattern. The wafer is subjected to a heat treatment before and after the resist is applied and the resist film is developed.

In some cases, modules of a substrate processing apparatus perform the respective processes for the wafer while gas flow is generated on a surface of the wafer. For example, in a heating module for performing a heat treatment, the gas flow is generated on the surface of the wafer in order to prevent sublimates, which may be generated from various films such as the resist film formed on the wafer during the heat treatment, from being attached to the wafer. In addition, in a module for forming a resist film, a resist film is formed, by spin coating, and in order to prevent mists from being attached to the wafer, while the interior of a cup onto which a wafer is loaded is evacuated and simultaneously gas is supplied onto the wafer surface from an upper portion of the cup.

However, if the directions and speeds of the gas flow generated in respective portions of the planar surface of the wafer are in disorder, a deviation in a temperature distribution on the planar surface of the wafer also occurs, which may result in deterioration of process uniformity on the surface of the wafer. In addition, if a deviation in the gas flow occurs between modules which perform the same process for wafers, the process uniformity between the wafers may be deteriorated. In order to prevent such deterioration, the direction and speed of the gas flow is previously calculated through a simulation by a computer, and the gas flow of a module has been adjusted accordingly. However, the higher process uniformity on a planar surface of a wafer and between wafers is required. Under these circumstances, a jig (sensor wafer) having a shape generally similar to a wafer may be used to measure a distribution of the gas flow directions and speeds by means of sensors provided on the surface of the jig.

In order to reduce the effort required in the measurement, the sensor wafer may be transferred between the aforementioned modules in the same way as the wafer, and the data of the gas flow directions and speeds are automatically obtained in each module or a transfer path of the wafer. However, to this end, a variety of components, in addition to the sensors, need to be installed on the sensor wafer. Specifically, it is under consideration to provide a power supply unit for supplying the sensors with power, a memory for storing the data obtained from the sensors, a transmission unit for transmitting the data to the outside, and the like.

However, even though there is an objective to obtain the data of the gas flow directions and speeds when a wafer is processed, the shape of the sensor wafer cannot be much different from the shape of the wafer. That is, the positions in which the components can be disposed are limited. In addition, the sensors are disposed in the positions in which the components cause a little disorder to the gas flow. That is, the positions in which the sensor can be disposed are limited, and under such condition, there is a need for a technique to measure the gas flow with high accuracy. In the prior art, a problem of such a sensor layout is not considered, and the sensors can detect only the gas flow speeds in a predetermined straight direction. Thus, it is insufficient to measure a distribution of the gas flow directions and speeds with high accuracy.

SUMMARY

The present disclosure in some embodiments provides a technique for detecting with high accuracy gas flow directions and speeds in a plurality of measurement regions in a surface of a substrate in a loading unit of a substrate processing apparatus even though a region in which sensors of a sensor substrate can be disposed is limited.

According to an aspect of the present disclosure, provided is a method for obtaining data on gas flow directions in a plurality of measurement regions in a surface of a substrate loaded onto a loading unit of a substrate processing apparatus. The method includes: loading a sensor substrate onto the loading unit in a first direction for obtaining data of gas flow directions in a first measurement region of a surface of the substrate, wherein the sensor substrate includes plural pairs of sensors provided at different distances from each other as viewed from a center of the surface, and wherein each pair of the sensors includes first and second sensors for obtaining vector data of a gas flow; changing the direction of the sensor substrate on the loading unit into a second direction to obtain data of gas flow directions in a second measurement region, wherein the second measurement region is separate from the first measurement region around the center of the substrate; obtaining vector data of a gas flow in a first straight direction from each first sensor of the sensor substrate loaded in the first and second directions, wherein the first straight direction is set along the surface of the sensor substrate for the first sensor; obtaining vector data of a gas flow in a second straight direction from each second sensor of the sensor substrate loaded in the first and second directions, wherein the second straight direction is set along the surface of the sensor substrate for the second sensor, and wherein the second straight direction makes an angle with the first straight direction set for the first sensor which makes a pair with the second sensor; and calculating a gas flow direction at each starting point in the first and second measurement regions by combining the vector data of the gas flow vector obtained from the first and second sensors which makes a pair with each other based on a predetermined starting point for the pair of the sensors.

According to a second aspect of the present disclosure, provided is a sensor substrate configured to obtain data on gas flow directions in a plurality of measurement regions in a surface of a substrate loaded onto a loading unit of a substrate processing apparatus. The sensor substrate includes: a plurality of first sensors configured to obtain vector data of gas flow in a first straight direction set along a surface of the sensor substrate; a plurality of second sensors configured to obtain vector data of gas flow in a second straight direction set to make an angle with the first straight direction along the surface of the sensor substrate, wherein each of the second sensors makes a pair with each of the first sensors, and wherein the pairs of sensors are respectively provided at different distances as viewed from the center of the surface; and at least one of a transmission unit configured to wirelessly transmit the vector data obtained from the first and second sensors to the outside of the sensor substrate and a memory configured to store the data to calculate a gas flow direction at each starting point by combining the vector data of the gas flow vector obtained from the first and second sensors which makes a pair with each other based on a predetermined starting point for the pair of the sensors.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 18 is a plane view of a heating module installed to the coating and developing device.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

First Embodiment

A sensor wafer 1 according to a first embodiment of the present disclosure will be described. This sensor wafer 1 is a jig, which is configured to estimate gas flow directions and speeds of a plurality of respective portions of a planar surface of a wafer W for manufacturing a semiconductor. More specifically, the sensor wafer 1 is transferred into a coating and developing device 4, which is a substrate processing apparatus, in a similar way to the wafer W, and the data of the gas flow directions and speeds detected at the plurality of respective portions of the planar surface are wirelessly transmitted to a control unit 5 of the coating and developing device 4 (see FIG. 9). Then, the control unit 5 calculates a distribution of the gas flow speeds and directions based on the data.

Figure 1:
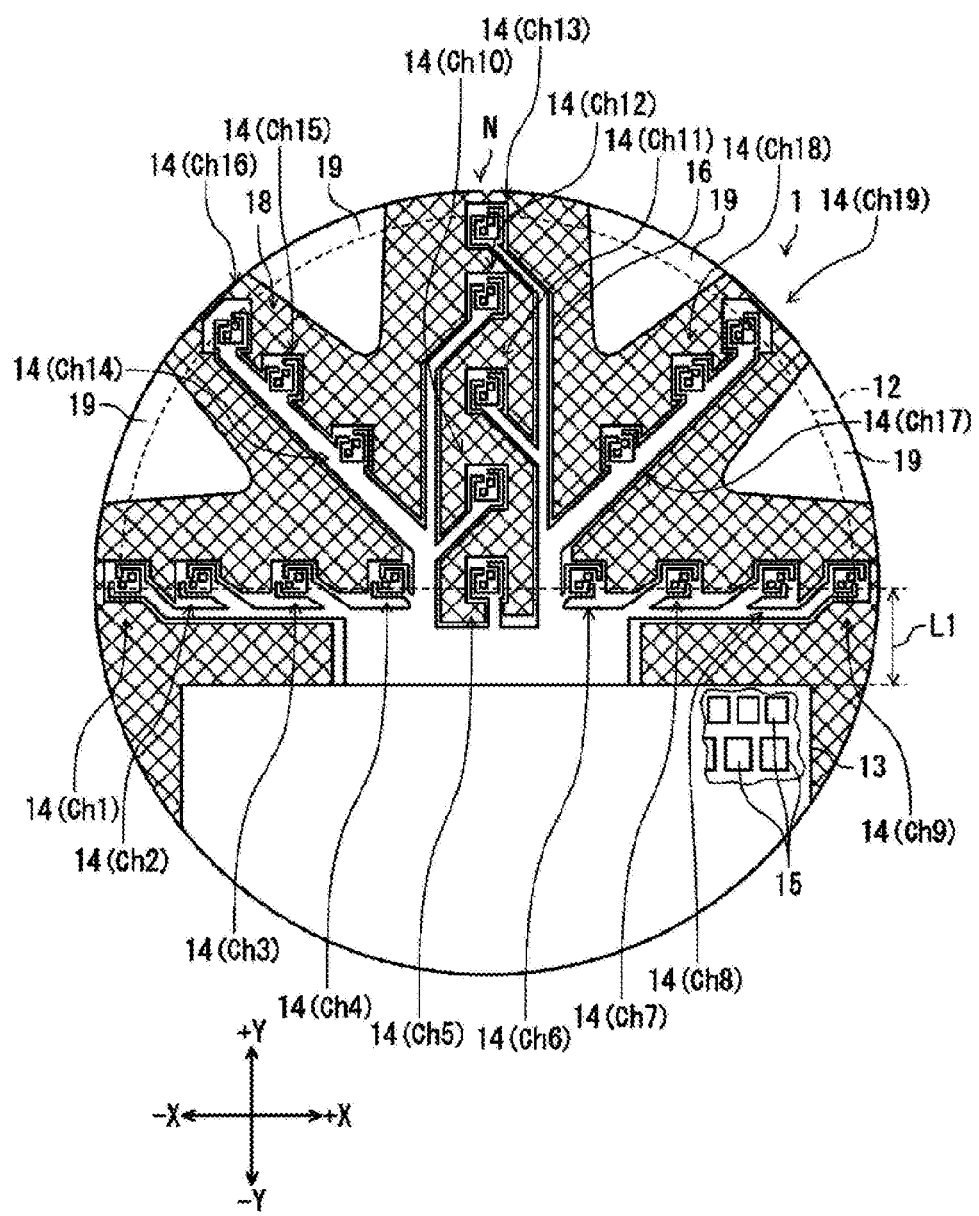
FIG. 1 is a plane view of a sensor wafer according to an embodiment of the present disclosure.
Figure 2:
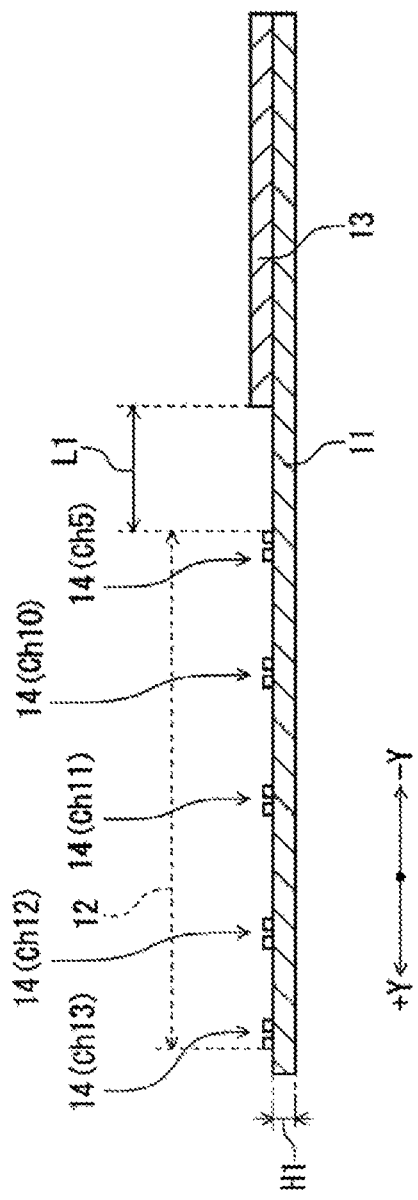
FIG. 2 is a side view of the sensor wafer.

FIGS. 1 and 2 are a plane view and a side view showing the sensor wafer 1, respectively. The sensor wafer 1 includes a substrate main body 11. The substrate main body 11 is made of silicon, and is configured in the shape of a circular disk, for example having a diameter of 300 mm, in a similar way to the wafer W. The substrate main body 11 shown in FIG. 2 has a height H1, for example, of 7 mm. A notch N that is a cutout is formed at a peripheral portion of the substrate main body 11 in order to specify a direction thereof.

In order to divide the substrate main body 11 into two regions, the surface of the substrate main body 11 is provided with a sensor-pair disposing region 12 and a component disposing region 13 that are approximately semicircular regions located opposite and facing each other. The sensor-pair disposing region 12 is provided with 19 pairs of sensors 14 for measuring the gas flow directions and speeds, which are spaced apart from each other. The pairs of sensors 14 are disposed to radially spread in five directions from the center of the substrate main body 11 toward the peripheral portion thereof, and the disposing region includes the diameter of the substrate main body 11 including the center thereof.

The component disposing region 13 is an approximately semicircular region formed opposite to the sensor-pair disposing region 12. The component disposing region 13 is provided with a plurality of circuit components 15 constituting a circuit element or an integrated circuit, a power supply unit (battery), which will be described later, and the like. In FIG. 1, only some of the circuit components 15 within a region surrounded by a broken line are shown for the purpose of simplicity. In order to suppress an influence on the gas flow generated around the pairs of sensors 14, the component disposing region 13 is provided to be spaced apart from the sensor-pair disposing region 12. The pairs of sensors 14 in the sensor-pair disposing region 12 are spaced apart from the circuit components 15 in the component disposing region 13 by a shortest spacing distance L1, for example, of 80 mm.

A wiring forming region 16 is formed to extend from the component disposing region 13 toward the respective pairs of sensors 14. The wiring forming region 16 has a conductor pattern 17 (see FIG. 3) formed in the shape of a thin film, for example made of aluminum, and is electrically connected to the respective components of the component disposing region 13. Although the conductor pattern 17 is actually constituted by a plurality of lines, the conductor pattern 17 is shown in FIG. 1 as a single line which is a collection of a plurality of parallel lines for the sake of simplicity. A mesh-shaped pattern 18 is formed of aluminum in the outside of the wiring forming region 16 to serve as a ground. The pattern 18 limits impedance of the conductor pattern 17, thereby serving to suppress noise of the signal transmitted through the conductor pattern 17. The substrate main body 11 has a region 19 formed in the periphery thereof, in which both the conductor pattern 17 and the pattern 18 are not formed for user's handling.

Figure 3:
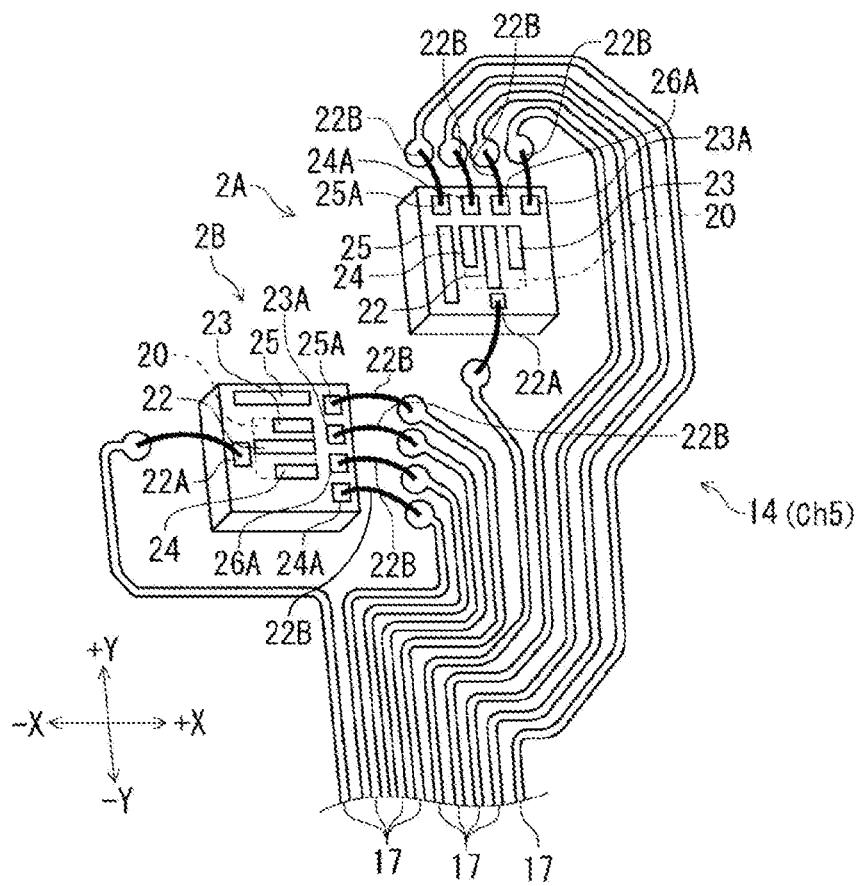
FIG. 3 is a perspective view of a pair of sensors installed to the sensor wafer.

The 19 pairs of sensors 14 serve as channels Ch1 to 19, respectively. The pairs of sensors of the respective channels Ch1 to 19 have the same configuration as each other. FIG. 3 shows a pair of sensors 14 of Ch5 at the center of the sensor wafer 1, and the pair of sensors 14 of Ch5 will be described as an example. This pair of sensors 14 of Ch5 includes gas flow speed sensors 2A and 2B for obtaining data on the gas flow speeds. Each of the gas flow speed sensors 2A and 2B outputs a signal based on a speed of a gas flow flowing in a predetermined straight direction on the surface thereof. The gas flow speed sensors 2A and 2B have the same configuration except that they are disposed in different directions in each of which the speed of the gas flow can be detected.

As an example, the gas flow speed sensor 2A will be described with reference to longitudinal sectional side views of FIGS. 4 and 5. The gas flow speed sensor 2A is formed, for example, of a square chip as viewed from the top. A recess 21 is formed in the center of the chip, and an insulating thin film 20 is formed to cover a surface of the recess 21. A heater 22 and thermopiles 23 and 24 in which the heater 22 is interposed therebetween are formed on the insulating thin film 20. In addition, a temperature sensor 25, which may be a resistance temperature detector, is provided in the chip, and resistance of the temperature sensor 25 is varied depending on the ambient temperature.

Figure 5:
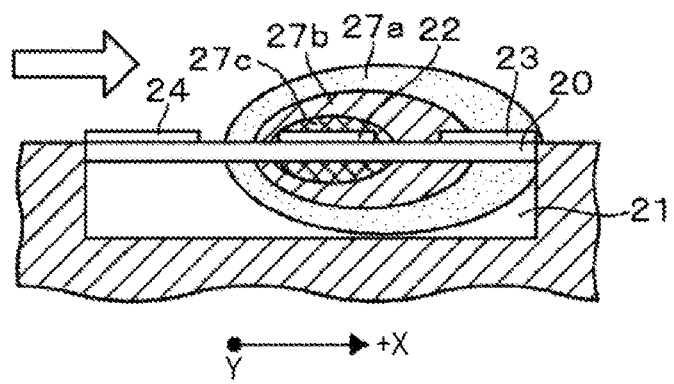
FIG. 5 is a longitudinal sectional side view of the gas flow speed sensor.

The heater 22, the temperature sensor 25, and the circuit components 15 in the component disposing region 13 constitute a temperature compensation circuit 31 shown in FIG. 5. In the temperature compensation circuit 31, the heater 22 and the temperature sensor 25 are connected in series to fixed resistors R1 and R2, respectively. A midpoint between the heater 22 and the fixed resistor R1 and a midpoint between the temperature sensor 25 and the fixed resistor R2 are connected to an inverted input terminal and a non-inverted input terminal of an operational amplifier OP1, respectively. An output terminal of the operational amplifier OP1 is connected to the fixed resistors R1 and R2.

The heater 22 and the temperature sensor 25 are connected to a ground. As such, the heater 22, the temperature sensor 25 and the fixed resistors R1 and R2 constitute a bridge circuit. In addition, a current supply circuit 30 is provided between the ground and an electrode to which a power source voltage Vcc is applied. The current supply circuit 30 is connected between the fixed resistor R2 and the temperature sensor 25. The current supply circuit 30 controls current supplied to the bridge circuit. The higher ambient temperature provides higher resistance Rb of the temperature sensor 25. In this way, the higher resistance Rb of the temperature sensor 25 provides a higher voltage between the fixed resistor R2 and the temperature sensor 25, and then, the higher voltage therebetween provides lower current to be supplied from the current supply circuit 30 to the bridge circuit.

The temperature of the heater 22 is varied depending on a magnitude of a gas flow, and power is supplied from the operational amplifier OP1 in order to compensate for heat by the heater 22. More specifically, if the gas flow becomes larger and thus the temperature of the heater 22 becomes lower, since resistance Rh of the heater 22 decreases and therefore an input voltage of the negative (−) terminal of the operation amplifier OP1 becomes lower, a voltage output from the operation amplifier OP1 to the bridge circuit becomes higher. Then, a voltage applied to the heater 22 and the temperature sensor 25 that is a resistance temperature detector becomes higher. This increased voltage results in higher temperature of the heater 22. On the contrary, if the gas flow becomes smaller, the voltage output from the operation amplifier OP1 to the bridge circuit becomes lower and the temperature of the heater 22 becomes lower. This operation keeps the temperature of the heater 22 constant.

Figure 6:
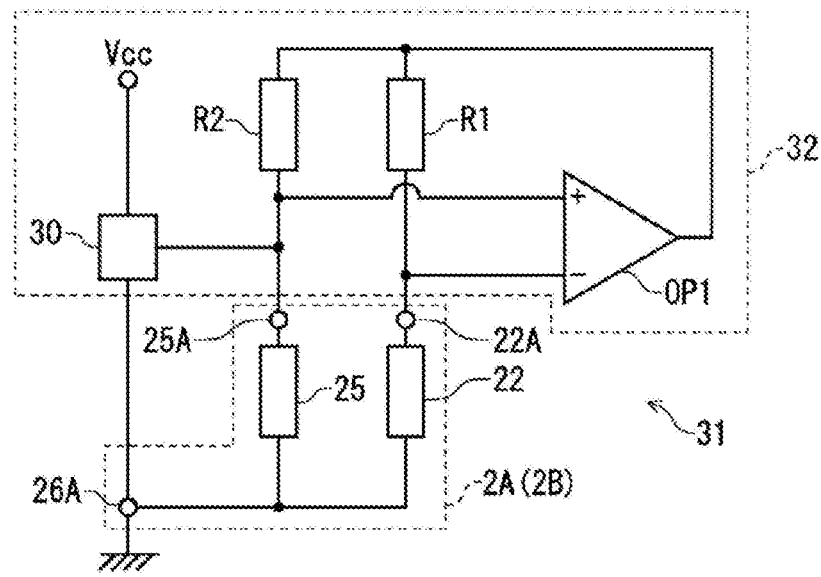
FIG. 6 is a circuit diagram including circuit elements constituting the gas flow speed sensor.

In addition, if the ambient temperature is varied and the resistance Rb of the temperature sensor 25 is changed accordingly, a voltage ratio of the temperature sensor 25 to the fixed resistor R2, a potential of the inverted input terminal of the operational amplifier OP1, an output of the operation amplifier OP1, and an output of the heater 22 are also changed as a result. Specifically, an increase of the ambient temperature results in an increase of the temperature of the temperature sensor 25 and therefore an increase of the resistance Rb of the temperature sensor 25. Since the fixed resistors R1 and R2 are configured to have the unchangeable resistance by the gas flow and a ratio Rh/Rb is constant under the balancing condition of the bridge circuit, the resistance Rh is increased and the temperature of the heater 22 is thus increased. On the contrary, a decrease of the ambient temperature results in a decrease of the resistance Rb of the temperature sensor 25, whereby the resistance Rh is decreased and thus the temperature of the heater 22 is decreased. This operation allows the temperature of the heater 22 to be compensated so that the heater 22 may have a higher temperature than the ambient temperature by a predetermined degree. The current supply circuit 30 serves to prevent a deviation between a change in the ambient temperature and a change in the temperature of the heater 22 by controlling the current as described above. The operational amplifier OP1, the fixed resistors R1 and R2, and the current supply circuit 30 are shown in FIG. 6 as a component group 32, and the component group 32 is constituted by some of the aforementioned circuit components 15.

Figure 7:
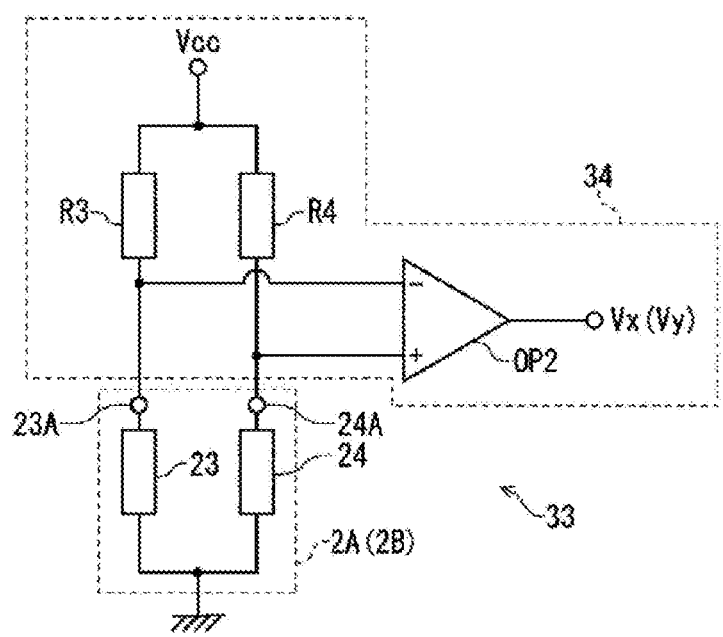
FIG. 7 is a circuit diagram including circuit elements constituting the gas flow speed sensor.

The thermopiles 23 and 24 constitute a gas flow speed detection circuit 33 shown in FIG. 7. The thermopiles 23 and 24 are connected in series to fixed resistors R3 and R4, respectively, and midpoints therebetween are connected to an inverted input terminal and a non-inverted input terminal of an operational amplifier OP2, respectively. In addition, the fixed resistors R3 and R4 are connected to the electrode to which the power source voltage Vcc is applied, and the thermopiles 23 and 24 are connected to a ground, thereby forming a bridge circuit. The fixed resistors R3 and R4 and the operational amplifier OP2 are shown in the figure as a component group 34, and the component group 34 is constituted by some of the aforementioned circuit components 15.

The operation of the gas flow speed detection circuit 33 will be described with reference to FIGS. 4 and 5. In FIGS. 4 and 5, a distribution of heat emitted from the heater 22 is indicated by regions 27a, 27b and 27c directed to the heater 22 and having higher temperature in order. As shown in FIG. 4, under a state where no gas flow is generated in the arrangement direction of the thermopiles 23 and 24, the thermopiles 23 and 24 receive the same amount of heat and a predetermined voltage is outputted from the operational amplifier OP2. As shown in FIG. 5, if a gas flow is generated in the arrangement direction, the heat distribution of the heater 22 is biased depending on a speed of the gas flow, so that the temperature of the thermopile (denoted by reference numeral 23 in the figure) at the downstream side becomes higher than that of the thermopile (denoted by reference numeral 24 in the figure) at the upstream side. Such a change in temperature causes a change in resistance of the thermopiles 23 and 24, which results in a change in an output from the operational amplifier OP2. That is, the output from the operational amplifier OP2 is changed depending on the speed of the gas flow in the arrangement direction.

Figure 4:
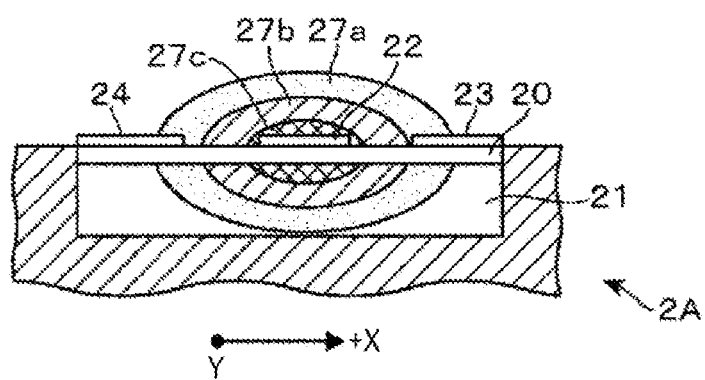
FIG. 4 is a longitudinal sectional side view of a gas flow speed sensor constituting the pair of sensors.

Under a state of the gas flow speed sensors 2A shown in FIG. 5 where the temperature of the thermopile 23 is increased, resistance of the thermopile 23 becomes higher than that of the thermopile 24, and thus an input of the negative terminal of the operational amplifier OP2 becomes larger relative to the state of the gas flow speed sensors 2A shown in FIG. 4. Contrary to that shown in FIG. 5, if a gas flow is generated toward the thermopile 24 and the temperature of the thermopile 24 is increased, the resistance of the thermopile 24 becomes higher than that of the thermopile 23 and thus an input of the positive terminal of the operational amplifier OP2 becomes large. That is, the gas flow speed sensors 2A and 2B can detect the gas flow direction and speed in the arrangement direction. The voltage output from the gas flow speed detection circuit 33 including the gas flow speed sensor 2A is denoted by Vx, and the voltage output from the gas flow speed detection circuit 33 including the gas flow speed sensor 2B is denoted by Vy.

Reference numerals 22A to 26A shown in FIGS. 3, 6 and 7 denote electrodes formed on surfaces of the gas flow speed sensors 2A and 2B. The respective electrodes 22A to 26A are connected to the conductor pattern 17 via bonding wires 22B as shown in FIG. 3, thereby forming the temperature compensation circuit 31 and the gas flow speed detection circuit 33. In addition, the bonding wires 22B are omitted in the figures except FIG. 3 for the purpose of simplicity.

The thermopiles 23 and 24 of the gas flow speed sensor 2A of each pair of sensors 14 are arranged in the same direction, which is referred to as an X direction in this example. In this example, the thermopile 23 is disposed in the right side in FIG. 1, which is referred to as the +X side. The thermopiles 23 and 24 of the gas flow speed sensor 2B of each pair of sensors 14 are arranged in the same direction, which is referred to as a Y direction in this example. In this example, the thermopile 23 is disposed in the upper side in FIG. 1, which is referred to as the +Y side. The X direction is perpendicular to the Y direction.

A method of measuring the gas flow direction and speed by each pair of sensors 14 will be described with reference to FIG. 8. The gas flow on the surface of the sensor wafer 1 are indicated by arrows in FIG. 8. As described above, a gas flow speed in the X direction and a gas flow speed in the Y direction are detected by the gas flow speed sensors 2A and 2B. Since the gas flow speed sensors 2A and 2B constituting the same pair of sensors 14 are disposed adjacent to each other, it may be said that gas flow of the same direction and speed are generated on the surfaces of these gas flow speed sensors 2A and 2B. In addition, since the gas flow speed detected by the gas flow speed sensor 2A is the gas flow speed in the X direction, it may be said that the detected gas flow speed corresponds to a vector component 3A in the X direction of the gas flow. In addition, since the gas flow speed detected by the gas flow speed sensor 2B is the gas flow speed in the Y direction, it may be said that the detected gas flow speed corresponds to a vector component 3B in the Y direction of the gas flow. The control unit 5, which will be described later, is configured to calculate and display the gas flow directions and speeds by combining the respective vector components in the X and Y directions with a point P set for each pair of sensors 14 as a starting point.

Figure 8:
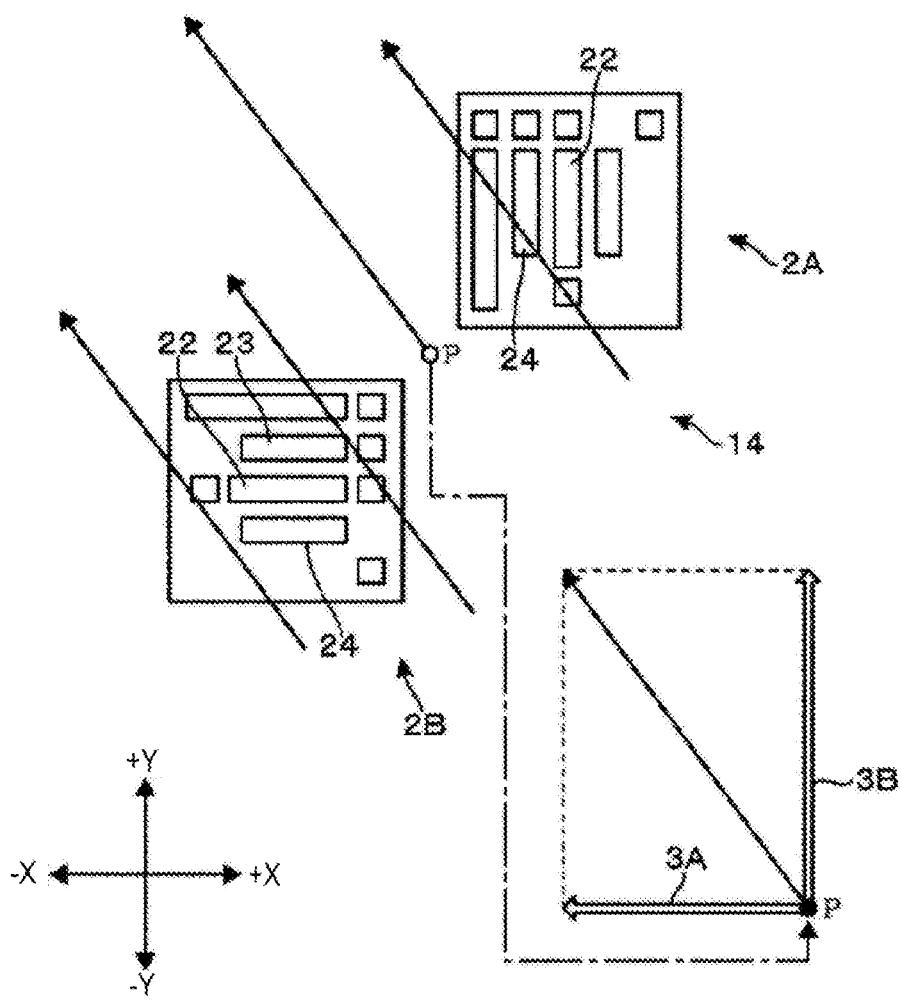
FIG. 8 is a view illustrating the principle of measurement by a sensor wafer.

Although it is shown in FIG. 8 that the starting point P is dragged out by an arrow of a chain line and is dislocated for the purpose of simplicity, the starting point P may actually be set at a position adjacent to the gas flow speed sensors 2A and 2B indicated by a white point in the figure. Accordingly, it may be said that gas flow of the same direction and speed are generated around the starting point P. As will be described later, in the control unit 5, a position of each starting point P is defined by an XY coordinate system with the center of the wafer W as an origin.

Figure 9:
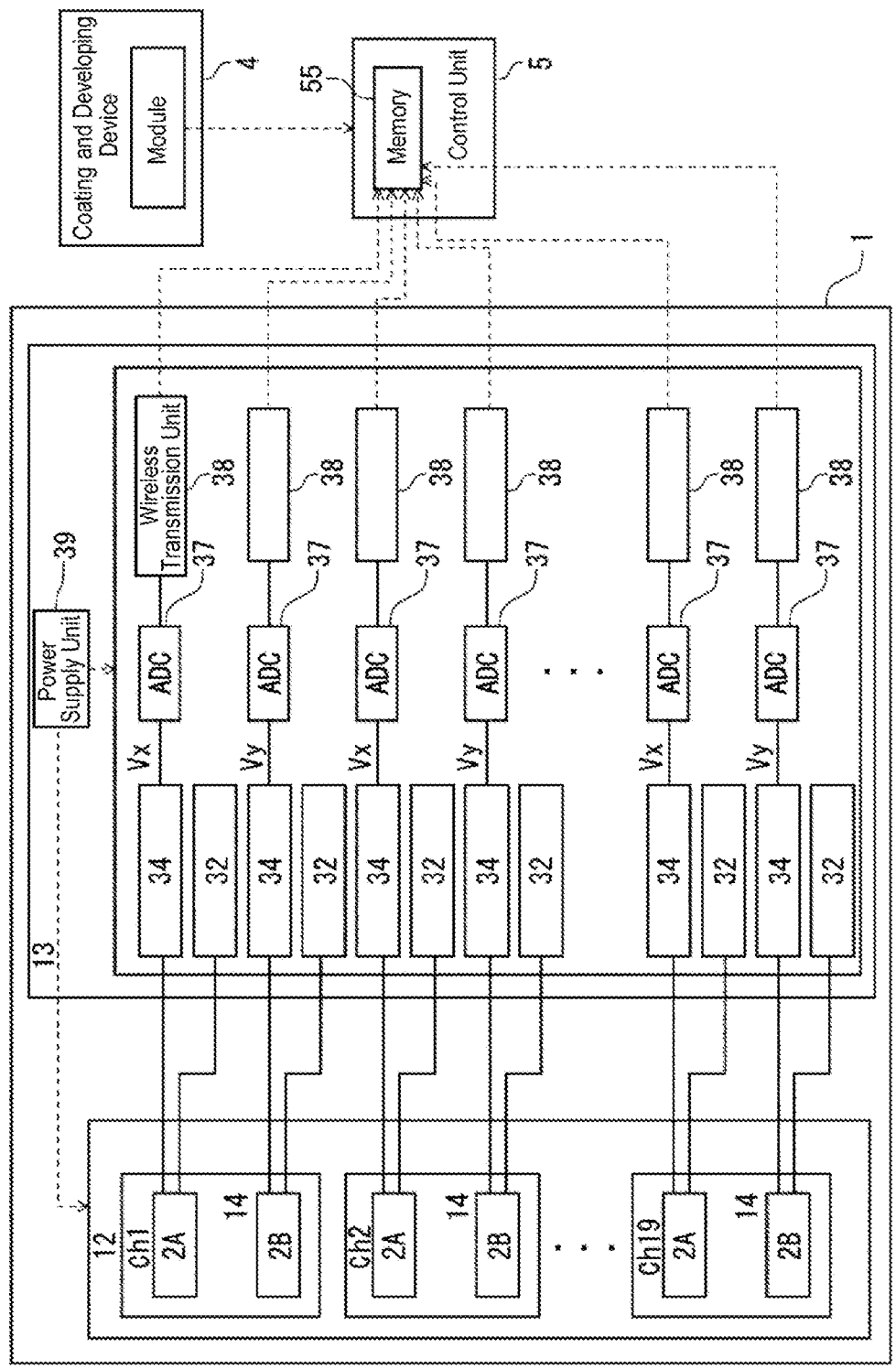
FIG. 9 is a block diagram showing the schematic configuration of the sensor wafer.

The configuration of the sensor wafer 1 will be described in more detail with reference to FIG. 9. A rear end side of the component group 34 of each of the channels Ch1 to Ch19 is provided with an analog/digital convertor (ADC) 37 and a wireless transmission unit 38, which are constituted by the circuit components 15. The voltages Vx and Vy corresponding to the gas flow speeds output from the component groups 34 of each channel Ch1 to Ch19 are converted from analog data to digital data by means of the ADC 37, and then, the digital data are wirelessly transmitted from the wireless transmission unit 38 to the control unit 5 of the coating and developing device 4. The wireless transmission unit 38 includes an antenna, a communication circuit, a control circuit for controlling the operation of the communication circuit, and the like in order to perform the transmission. In addition, the component disposing region 13 is provided with a power supply unit 39, for example, including a lithium battery. The power supply unit 39 supplies, for example, continuous power to the pairs of sensors 14 and the components of the component disposing region 13, which allows the voltages Vx and Vy to be always wirelessly transmitted from the wireless transmission unit 38.

Figure 10:
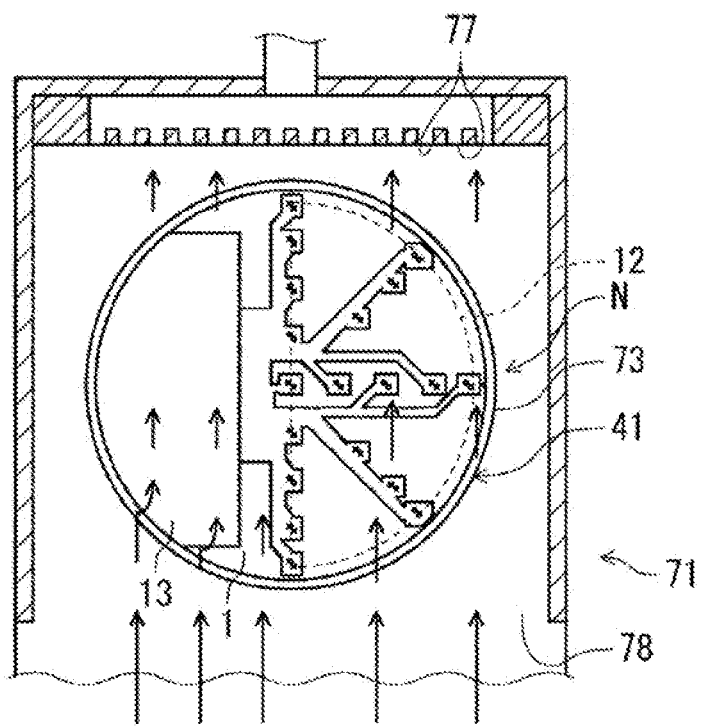
FIG. 10 is a view illustrating a state of measurement by the sensor wafer.
Figure 11:
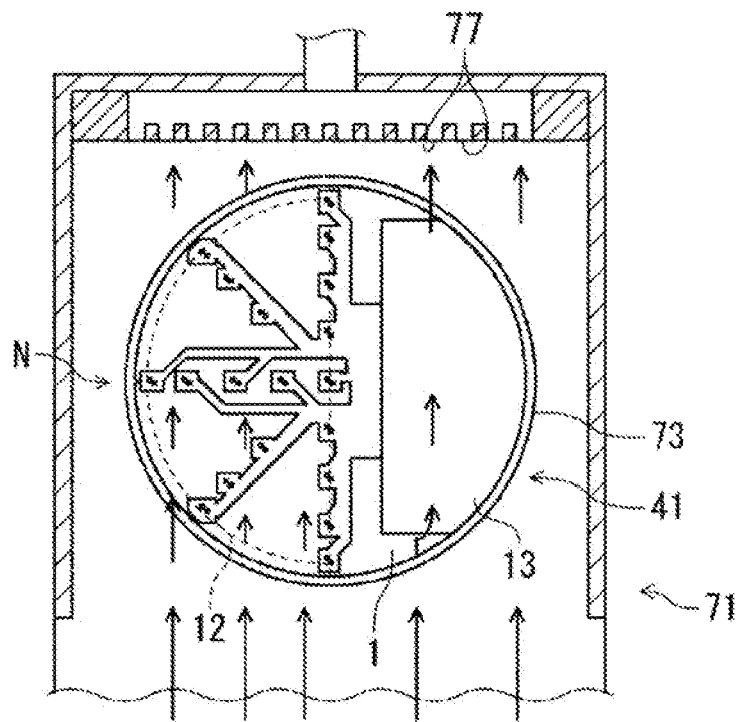
FIG. 11 is a view illustrating a state of measurement by the sensor wafer.

However, the sensor-pair disposing region 12 covers only about a half of the surface of the sensor wafer 1. Thus, if the measurement is performed with the wafer W loaded onto a wafer loading unit (loading region) 41 (see FIG. 10) in the coating and developing device 4, only the gas flow directions and speeds of respective portions in an about half region of the loading unit 41 can be measured. Accordingly, for example, as shown in FIG. 10, if the sensor wafer 1 is loaded onto the loading unit 41 in a predetermined direction and then the voltages Vx and Vy of each channel Ch1 to Ch19 are obtained, the direction of the sensor wafer 1 in the loading unit 41 is changed by 180 degrees as shown in FIG. 11. Thereafter, the voltages Vx and Vy of each channel Ch1 to Ch19 are obtained again. That is, when the second measurement of the voltages Vx and Vy is performed, the sensor wafer 1 is disposed so that the sensor-pair disposing region 12 is positioned in the region, in which the component disposing region 13 was first disposed, and then, the measurement is performed. In this way, a distribution of the gas flow directions and speeds at respective portions in the entire of the loading unit 41 can be obtained. FIGS. 10 and 11 show that the sensor wafer 1 is loaded onto a loading unit 41 of a heating module 71 of the coating and developing device 4. The heating module 71 will be described later.

Figure 12:
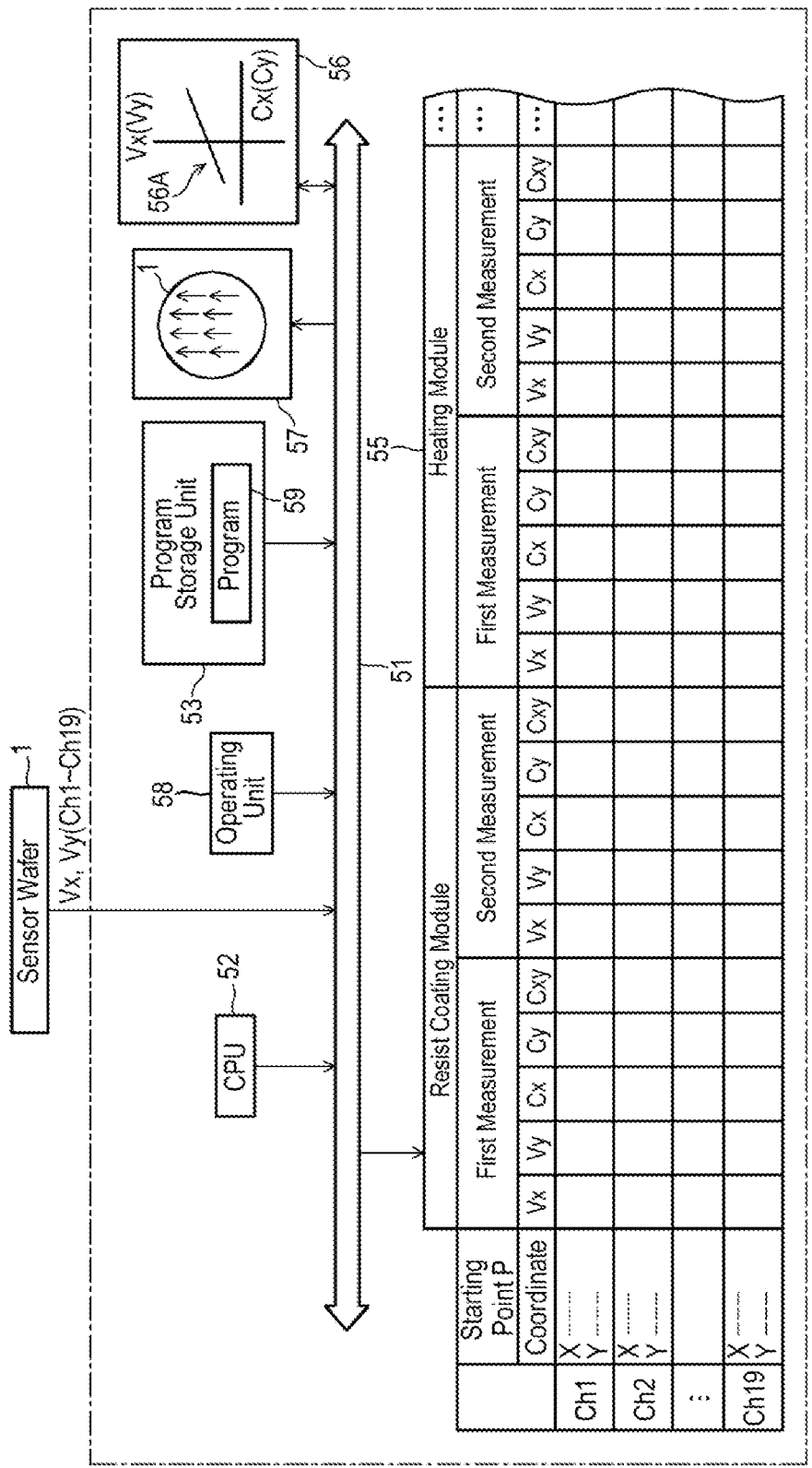
FIG. 12 is a block diagram of a control unit connected to the sensor wafer.

The control unit 5 of the coating and developing device 4 will be described with reference to FIG. 12. The control unit 5 includes a bus 51, to which a CPU 52, a program storage unit 53, a first memory 55, a second memory 56, a display unit 57 and an operating unit 58 are connected. A program 59 is stored in the program storage unit 53. For example, the program 59 alternates and executes a processing mode for transferring and processing a wafer W between the modules of the coating and developing device 4 and a measuring mode for performing the measurement by means of the sensor wafer 1, as described below. In addition, the program 59 transmits control signals to respective portions of the coating and developing device 4 so that the wafer W is transferred and processed and the sensor wafer 1 is transferred and performed to measure, thereby controlling the operation of a transfer mechanism of the wafer W and the operation of the modules. The program storage unit 53 includes a computer storage medium, such as a flexible disk, a compact disk, a hard disk, a magneto-optical (MO) disk and the like.

A variety of data for each channel Ch1 to Ch19 are stored in the first memory 55. The data include the voltages Vx and Vy wirelessly transmitted, gas flow speeds Cx and Cy in the X and Y directions, which are respectively calculated from the voltages Vx and Vy, a gas flow speed Cxy, which is calculated from the gas flow speeds Cx and Cy with the point P as a starting point, and an XY coordinate of the starting point P. These data are stored in association with each channel Ch1 to Ch19. In addition, Vx, Vy, Cx, Cy and Cxy are stored in each module installed to the coating and developing device 4. As described above, in each module, since the gas flow directions and speeds are measured twice, Vx, Vy, Cx, Cy and Cxy are stored corresponding to the number of times being measured. Also, the voltages Vx and Vy are continuously obtained after the obtainment of the data is initiated, and the voltages Vx and Vy are stored in the first memory 55 every time. By doing so, a distribution of the gas flow directions and speeds after the predetermined elapsed time from the initiation of the measurement may be displayed on the display unit 57.

Figure 13:
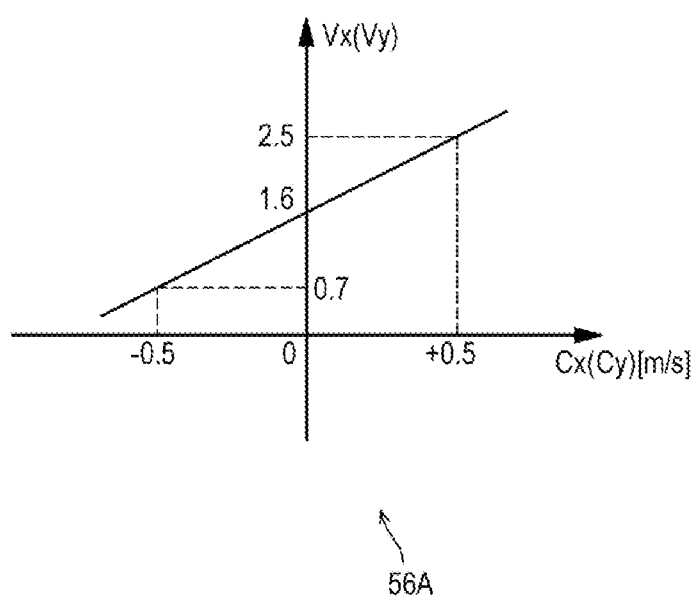
FIG. 13 shows a graph stored in the control unit.

A graph 56A shown in FIG. 13 is stored in the second memory 56. The graph 56A shows a relationship between the voltages Vx and Vy and the gas flow speeds Cx and Cy (m/sec). In the graph, a vertical axis represents the output voltages and a horizontal axis represents the gas flow speeds. Corresponding values of Cx and Cy in the graph 56A are read by the program 59 from Vx and Vy stored in the first memory 55. The read Cx and Cy are stored in the first memory 55 in association with Vx and Vy.

The display unit 57 is a display device. The program 59 calculates a gas flow direction by combining a gas flow speed in the X direction and a gas flow speed in the Y direction, which are obtained by each pair of sensors 14, with the point P as a starting point, as described above. In addition, since an angle between the X direction and the Y direction is 90 degrees, Cxy can be calculated as $\{(Cx)^2+(Cy)^2\}^{1/2}$ and is stored in the first memory 55 in association with Cx and Cy. These various operations are performed by the CPU 52.

For example, for both the first and second measurements on the same module, the environments in the module are set to be the same. In addition, each measurement is performed in a state where the sensor wafer 1 is in a predetermined direction in each module. For example, based on the voltages Vx and Vy obtained after the same elapsed time from the initiation of the measurement for the two measurements, the program 59 calculates gas flow speeds Cx, Cy and Cxy in each measurement. Then, based on these calculation results and the coordinates of the starting points P, a distribution of gas flow directions and speeds of the entire of the loading unit 41 is displayed on the display unit 57.

Figure 14:
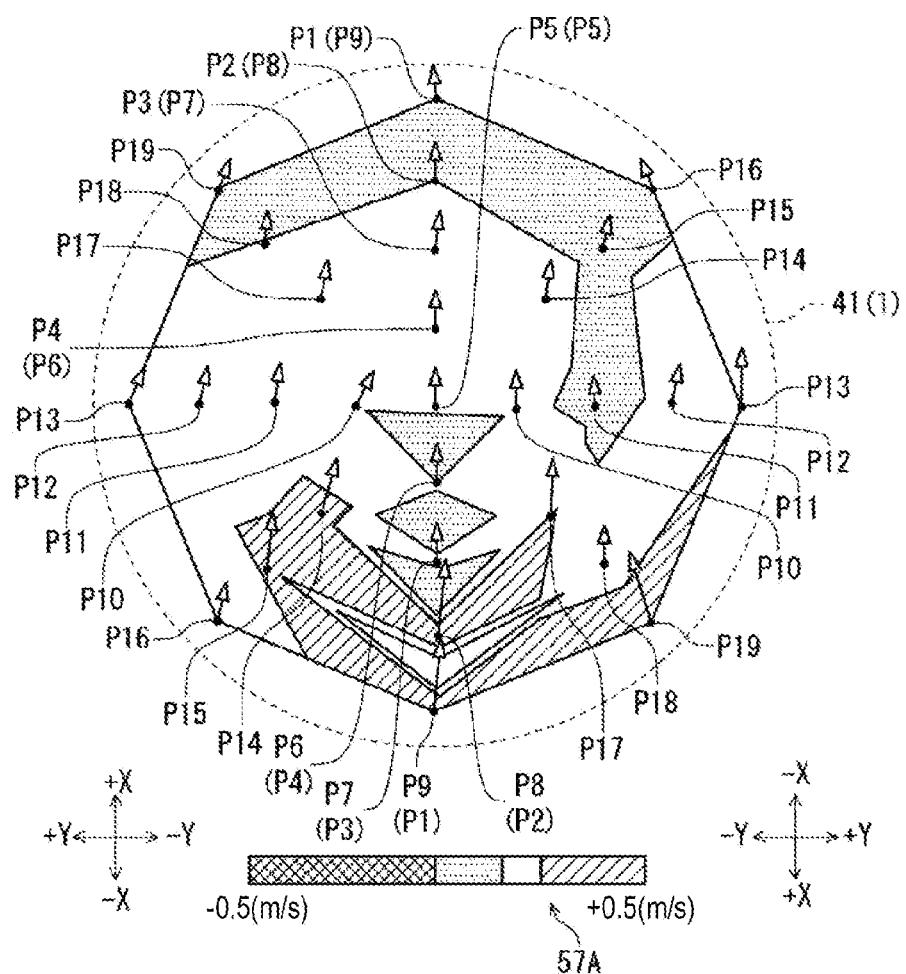
FIG. 14 shows an image of a distribution of gas flow directions and speeds displayed on a display unit of the control unit.

FIG. 14 shows one example of a display of the display unit 57 when the measurements are performed with the sensor wafer 1 loaded onto the loading unit 41 as shown in FIGS. 10 and 11. Starting points P in the respective first and second measurements are simultaneously displayed at predetermined positions of the display unit 57 based on set coordinates, and at the same time, the calculated gas flow directions are displayed by arrows extending from the respective starting points P. That is, although the measurements are separately performed for the respective semicircular regions of the wafer loading unit 41, a distribution of gas flow directions and speeds of the entire of the loading unit 41 is displayed on the screen. In the figure, the starting points P are respectively denoted by reference numerals P1 to P19 corresponding to channels Ch1 to Ch19. Longer arrows indicate higher calculated gas flow speeds Cxy.

Also, a distribution of the gas flow speeds is indicated on the display unit 57 in a color image in addition to the arrows. The external appearance of the loading unit 41, i.e., the sensor wafer 1 is displayed on the screen, and the planar surface of the sensor wafer 1 is indicated in color based on a calculated values of the gas flow speed Cxy of each of the channels Ch1 to Ch19. Although an actual image is displayed using a color gradation, FIG. 14 shows that a distribution of the gas flow speeds is instead partitioned by contour lines for convenience and the partitioned regions are assigned different patterns depending on a magnitude of gas flow speed. A bar 57A showing the correspondence between color in the gradation and a value of gas flow speed Cxy is displayed along with the distribution of gas flow speed, which allows a user to identify values of the gas flow speeds Cxy in respective portions of the planar surface of the loading unit 41.

In FIG. 14, a starting point in the second measurement which is coincident to a starting point in the first measurement is put in brackets. Since the measurements are performed while changing a direction of the sensor wafer 1, there is an overlapped starting point, i.e., a point at which both the first and second measurements are performed in the loading unit 41. However, such a point is displayed, for example, with an average value of the respective measurement results.

Returning to FIG. 12, the operating unit 58 will be described. The operating unit 58 includes, for example, a mouse, a keyboard, a touch panel, and the like. A user may use the operating unit 58 to set a module in which the measurement is performed with the sensor wafer 1. Also, if the module to be measured does not have a function of changing a direction of the sensor wafer 1, the sensor wafer 1 is transferred to another module and then is changed in its direction. Such a module for changing the direction is also set by the operating unit 58.

In addition, the user instructs the display unit 57 to display the aforementioned images through the operating unit 58. For the module on which the measurement is performed, if a predetermined time after the initiation of the measurement is set, the gas flow speeds Cx, Cy and Cxy are calculated based on the voltages Vx and Vy obtained at the set time. Then, as shown in FIG. 14, a distribution of the gas flow directions and speeds is displayed. Also, an arbitrary time interval from the initiation of the measurement to the end thereof is set, the gas flow speeds Cx, Cy and Cxy are calculated corresponding to the voltages Vx and Vy obtained during the time interval, so that the gas flow speeds are displayed in series with respect to time. That is, changes in the gas flow directions and speeds over time may be displayed on the display unit 57 with a moving picture. The display on the display unit 57 is also controlled by the program 59.

Figure 15:
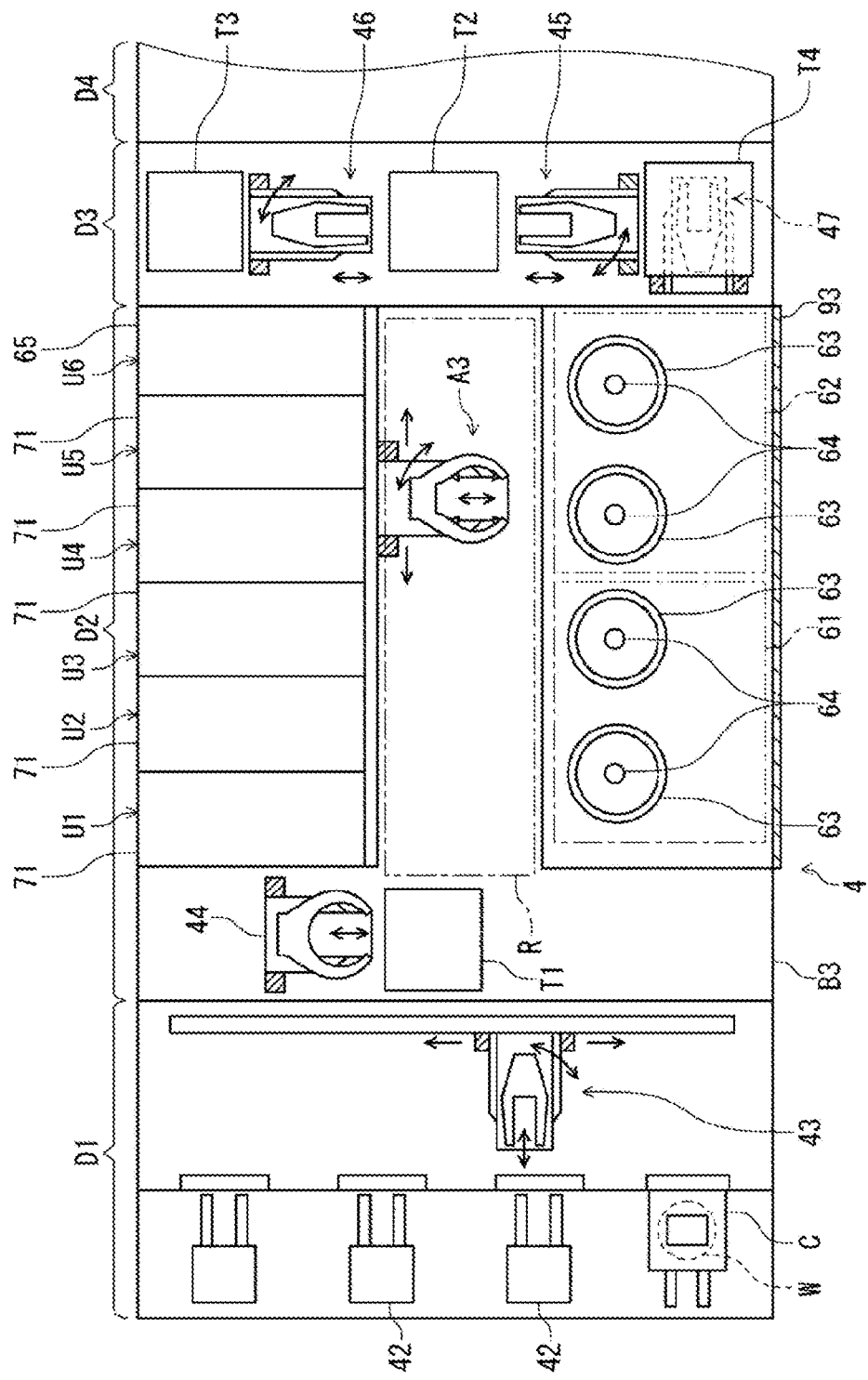
FIG. 15 is a plane view of a coating and developing device in which the sensor wafer is used.
Figure 16:
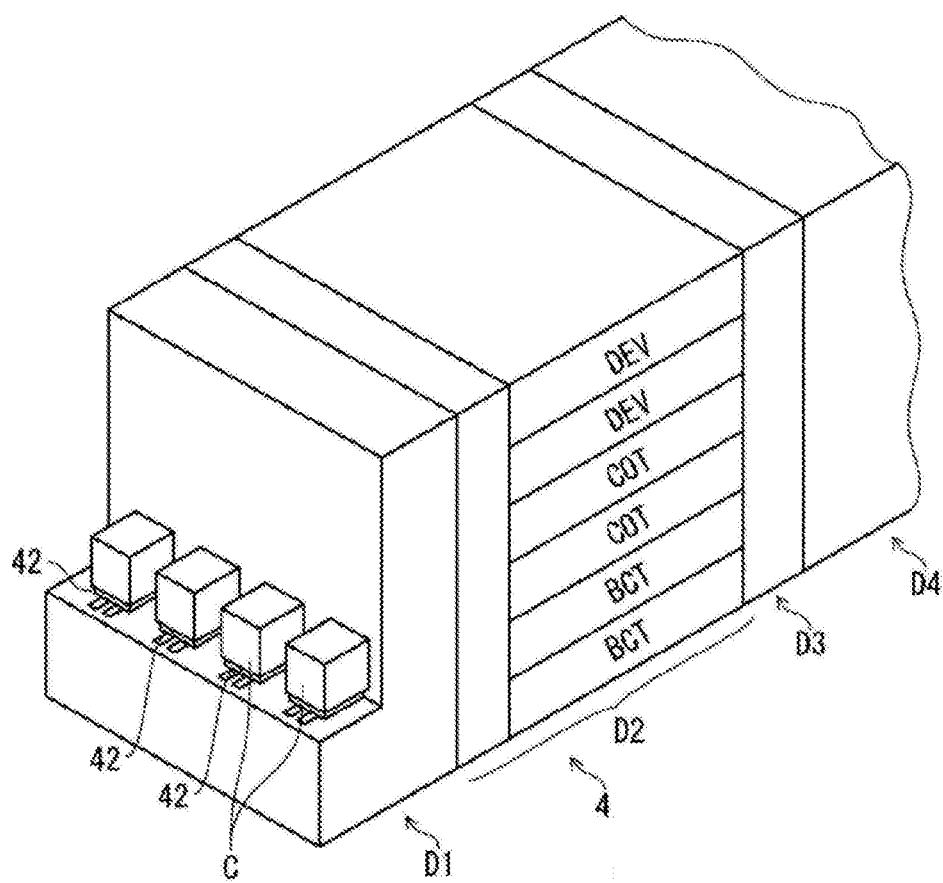
FIG. 16 is a perspective view of the coating and developing device.
Figure 17:
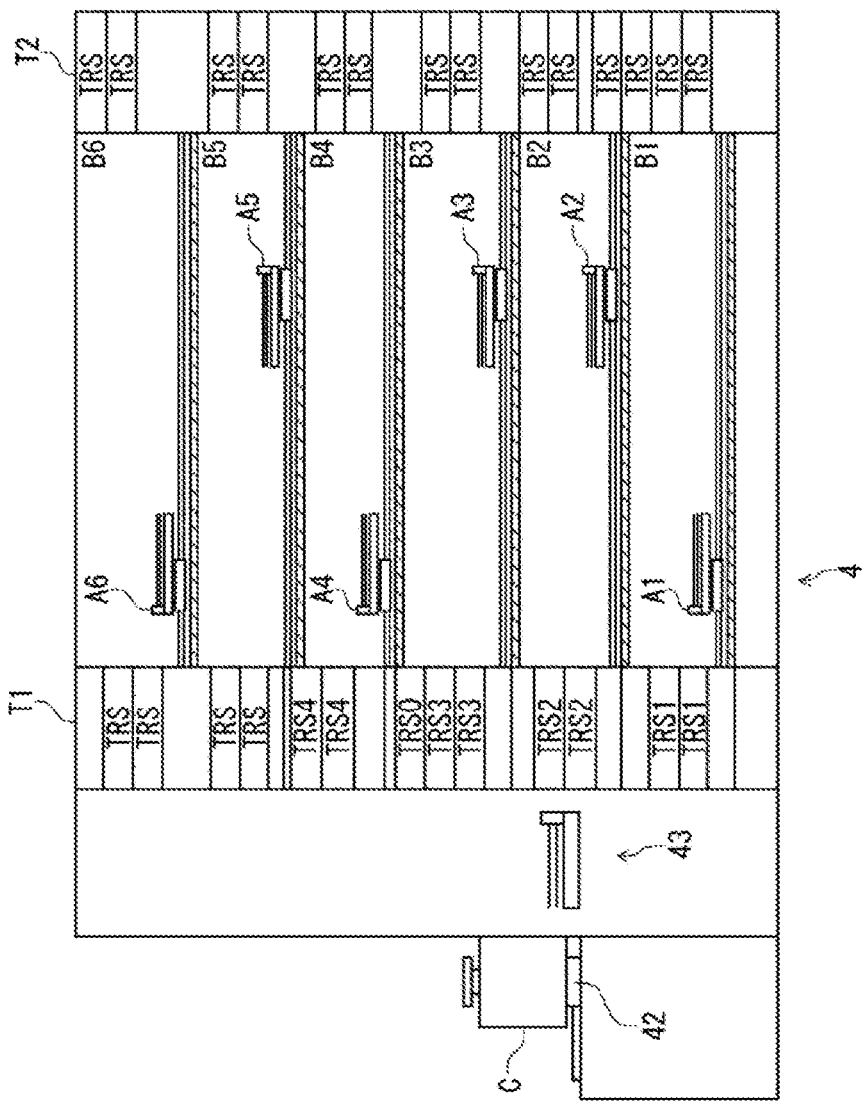
FIG. 17 is a schematic longitudinal sectional side view of the coating and developing device.

Subsequently, an example of the coating and developing device 4 will be described with reference to FIGS. 15 to 17. FIGS. 15, 16 and 17 are a plane view of the coating and developing device 4, a perspective view thereof, and a schematic longitudinal sectional side view thereof, respectively. The coating and developing device 4 includes a carrier block D1, a processing block D2 and an interface block D3 arranged in series. An exposure device D4 is connected to the interface block D3. In the following descriptions, it is assumed that an arrangement direction of the blocks D1 to D3 is referred to as the forward-backward direction. The carrier block D1 serves to load/unload a carrier C containing a wafer W into/out of the coating and developing device 4 and includes a mounting stage 42 of the carrier C and a transfer and mounting mechanism 43 for transferring the wafer W from the carrier C.

The processing block D2 includes first to sixth unit blocks B1 to B6, in which a wafer W is subjected to liquid treatment, and which are stacked in order from the bottom. In some cases, for convenience in description, a process of forming an anti-reflective film on a back side of the wafer W is referred to as "BCT," a process of forming a resist film on the wafer W is referred to as "COT," and a process of forming a resist pattern on the wafer W after exposure is referred to as "DEV." Also, in FIG. 16, the unit block is expressed as a "layer" to avoid the complexity of the substrate. In this example, a pair of BCT layers, a pair of COT layers, and a pair of DEV layers are stacked in order from the bottom, and the COT layer B3 will be described as a representative with reference to FIG. 15. Shelf units U1 to U6 are disposed in the forward-backward direction in one side of the left and right sides of a transfer region R facing toward the carrier block D1 to interface block D3, and a resist coating module 61 and a protective film forming module 62 each of which is a liquid treatment unit are arranged in the forward-backward direction in the other side. The transfer region R is supplied with air from an air supply unit (not shown).

The resist coating module 61 is provided with cups 63. A stage 64, which sucks and holds a back side of a wafer W and simultaneously is rotatable around the vertical axis, is provided in each cup 63. While the stage 64 holds and supports the wafer W, resist from a chemical nozzle is supplied onto the wafer W and spin coating is performed. The spin coating is performed in a state where the air is supplied from the ceiling of the resist coating module 61 and at the same time the interior of the cup 63 is evacuated. The protective film forming module 62 is configured so that the processing is performed with chemicals for forming a protective film using the cup 63 in the same manner.

A transfer arm A3 which is a transfer mechanism of a wafer W is provided within the transfer region R. The transfer arm A3 is configured to move forward and backward, be elevatable up and down, be rotatable around a vertical axis, and be movable in the longitudinal direction of the transfer region R. Further, the transfer arm A3 can deliver the wafer W between the respective modules of the unit block B3. In addition, the shelf units U1 to U6 are arranged along the longitudinal direction of the transfer region R, and the shelf units U1 to U5 are configured such that heating modules 71 for performing heat treatment of the wafer W are stacked, for example in a two stage. The shelf unit U6 is constituted by a stacked periphery exposure module 65.

The periphery exposure module 65 is provided with an exposure unit for exposing a periphery of the wafer W, a stage for supporting a back side of the wafer W and simultaneously being rotatable and transversely movable, and an optical sensor for determining a position of the periphery of the wafer W in order to control an exposure width. The optical sensor includes a light projector for projecting light onto the periphery of the rotating wafer W, and a light receiver that makes a pair with the light projector. The control unit 5 detects the position of the periphery of the wafer W based on an incident range of the light which the light receiver receives from the light projector. As described later, when the sensor wafer 1 is used, the direction of the notch N of the sensor wafer 1 is detected based on the incident range, and then, the direction of the sensor wafer 1 is adjusted by the stage.

The unit block B4 has the same configuration as the unit block B3. Each of the other unit blocks B1, B2, B5 and B6 has the same configuration as the unit block B3 or B4 except that different chemicals are supplied to the wafer W, the heating module 71 is installed instead of the periphery exposure module 65, and the like. The unit block B1 or B2 is provided with an anti-reflective film forming module instead of the resist coating module 61 and the protective film forming module 62, the unit block B5 or B6 is provided with a developing module. In FIG. 17, transfer arms of the unit blocks B1 to B6 are denoted by A1 to A6, respectively.

A tower T1 vertically extending over the respective unit blocks B1 to B6 and a transfer arm 44 that is an elevatable transfer mechanism for delivering the wafer W to the tower T1 are provided in the side of the processing block D2 facing to the carrier block D1. The tower T1 is constituted by a plurality of stacked modules. Although the tower T1 is actually provided with a variety of modules, only transfer modules TRS for transferring the wafer W between the transfer arm 44 and the transfer arms A1 to A6 of the unit blocks B1 to B6 are shown for simplicity in description.

The interface block D3 is provided with towers T2, T3 and T4 vertically extending over the unit blocks B1 to B6. Reference numerals 45, 46 and 47 denote interface arms. The arm 45 transfers a wafer W between the tower T2 and the tower T4, the arm 46 transfers a wafer W between the tower T2 and the tower T3, the and arm 47 transfers a wafer W between the tower T2 and the exposure device D4. The tower T2 is constituted by stacked transfer modules TRS. The descriptions on the towers T3 and T4 will be omitted.

A schematic transfer path of a wafer W in the system including the coating and developing device 4 and the exposing device D4 will be simply described. The wafer W flows in the order of the carrier C, the transfer and mounting mechanism 43, the transfer module TRS of the tower T1, the transfer arm 44, the transfer module TRS of the tower T1, the unit block B1 (B2), the unit block B3 (B4), the interface block D3, the exposure device D4, the interface block D3, the unit block B5 (B6), the transfer module TRS of the tower T1, the transfer and mounting mechanism 43, and the carrier C.

The flow of the wafer W in the processing block D2 will be described in more detail. The unit blocks B1 and B2 for forming an anti-reflective film, the unit blocks B3 and B4 for forming a resist film, and the unit blocks B5 and B6 for performing an exposure process are respectively configured to be double. Wafers W are distributed and transferred to the doubled unit blocks. For example, when a wafer W is transferred to the unit block B1, the transfer arm 44 transfers the wafer W to a transfer module TRS1 corresponding to the unit block B1 (i.e., a transfer module for transferring the wafer W by means of the transfer arm A1) among the transfer modules TRS in the tower T1. A module in the tower T1, from which the transfer arm 44 receives a wafer W, is a transfer module TRS0, into which the transfer and mounting mechanism 43 loads the wafer W. In addition, assuming that a transfer module corresponding to the unit block B2 is a transfer module TRS2, the wafer W of the transfer module TRS0 is delivered to the transfer module TRS2 by means of the transfer arm 44.

Further, wafers W, on each of which an anti-reflective film has been formed in the unit block B1 or B2, are alternately distributed between and transferred to a transfer module TRS3 corresponding to the unit block B3 and a transfer module TRS4 corresponding to the unit block B4, for example via the transfer module TRS1 or TRS2, by means of the transfer arm 44.

The place onto which a wafer W is loaded is described as a module. The module is provided with a sensor (not shown) for detecting the loading and the unloading of a wafer W. If a wafer W is loaded into and unloaded out of each module, each sensor transmits a loading signal and an unloading signal, which respectively indicate that the wafer is load and unloaded, to the control unit 5. The respective modules are continuously evacuated at a predetermined set value, and a predetermined module, such as the transfer region R or the resist coating module 61 is continuously supplied with a predetermined amount of air.

Figure 19:
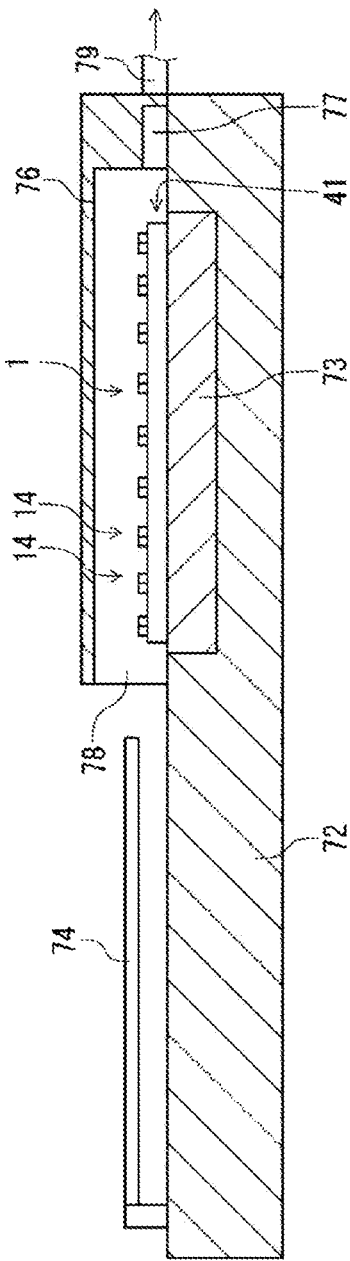
FIG. 19 is a side view of the heating module.

Before the measuring sequence of the gas flow is described, the heating module 71 will be described with reference to a plane view and a side view of FIGS. 18 and 19. In the figures, reference numeral 72 denotes a base, and reference numeral 73 denotes a heating plate for heating a wafer W. Reference numeral 74 denotes a cooling plate, which cools the wafer W that has been heated in the loading unit (loading region) 41 on the heating plate 73 and at the same time transfers the wafer W delivered from the transfer arm A3 onto the heating plate 73. Reference numeral 75 denotes liftable pins, which deliver a wafer W between the heating plate 73 and the cooling plate 74.

Assuming that a side in which the heating plate 73 is installed is referred to as an interior side and the side in which the cooling plate 74 is installed is referred to as a front side, a cover 76 is formed to surround the top side, left side, right side, and interior side of the heating plate 73, and a plurality of exhaust holes 77 are formed from side to side in the interior side of the cover 76. An opening portion 78 defining a gas supply hole is formed in the front side of the cover 76, and the air in the transfer region R enters the cover 76 through the opening portion 78 and is exhausted through the exhaust holes 77. While being exposed to the gas flow so formed, a wafer W is subjected to a heat treatment. In the figures, reference numeral 79 denotes an exhaust pipe connected to the exhaust holes 77.

Figure 20:
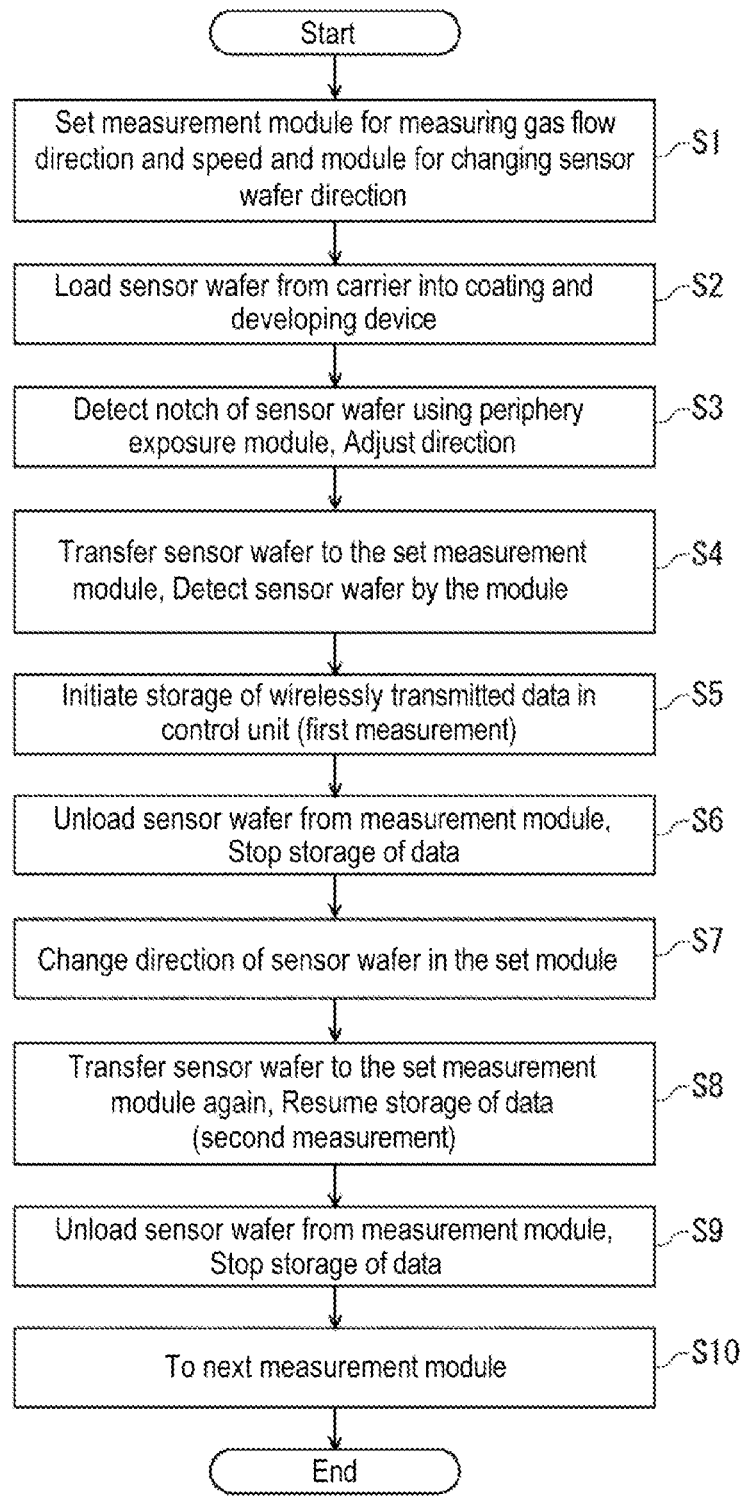
FIG. 20 is a flow chart illustrating a measuring sequence using the sensor wafer.

Subsequently, as an example, when the heating module 71 and the resist coating module 61 of the unit block B3 in the coating and developing device 4 are measured in order, the measuring sequence will be described with reference to a flow chart of FIG. 20. First, a user switches over from the processing mode for processing a wafer W to the measuring mode for measuring gas flow directions and speeds, as described above, through the control unit 5. Then, a module, on which the measurement of gas flow directions and speeds is performed, and order, in which the measurement on the module is performed, are set through the control unit 5. In addition, if the module to be measured cannot change a direction of the sensor wafer 1, a module for changing the direction is set. In this case, the measurements on the heating module 71 and then the resist coating module 61 are set to be sequentially performed. Since the heating module 71 cannot change the direction of a wafer W, a module for changing the direction is also designated. Here, for example, the case that the resist coating module 61 is designated will be described (Step S1). Also, a transfer path of the sensor wafer 1 is also set.

Subsequently, the carrier C containing the sensor wafer 1 instead of a wafer W is transferred to the carrier block D1, and the transfer and mounting mechanism 43 takes the sensor wafer 1 out of the carrier C (Step S2). The sensor wafer 1 is transferred to the unit block B3 through the tower T1 and then transferred to the periphery exposure module 65 by means of the transfer arm A3. The periphery exposure module 65 detects the notch N, and the direction of the sensor wafer 1 is adjusted so that the notch N faces a predetermined direction (Step S3).

The transfer arm A3 transfers the sensor wafer 1, of which the direction has been adjusted, to the heating module 71 designated in Step S1. A loading signal indicating that the sensor wafer 1 is transferred is transmitted from a wafer detecting sensor of the heating module 71 to the control unit 5 (Step S4). If the loading signal is received, the storage of the voltages Vx and Vy wirelessly transmitted from the sensor wafer 1 in the first memory 55 is initiated (Step S5).

With the direction of the sensor wafer 1 adjusted in Step S3, the sensor wafer 1 continuously obtains the voltages Vx and Vy after being transferred onto the heating plate 73 so that the sensor-pair disposing region 12 and the component disposing region 13 are respectively positioned at the left side and the right side as viewed from the opening portion 78 of the heating module 71 toward the exhaust holes 77, as shown in FIG. 10. The directions of the gas flow is indicated by the arrows in FIG. 10. In this case, since the sensor wafer 1 is disposed as described above, the gas flow toward the sensor-pair disposing region 12 flows straight to the exhaust holes 77 without colliding with the respective components of the component disposing region 13, thereby preventing the gas flow from being in disorder in the sensor-pair disposing region 12. After a predetermined time passes from the transmission of the loading signal, the sensor wafer 1 is delivered to the transfer arm A3 and then unloaded from the heating module 71. If the unloading signal indicating that the sensor wafer 1 is unloaded is transmitted from the wafer detecting sensor to the control unit 5 and the control unit 5 receives the signal, the storage of the voltages Vx and Vy is stopped (Step S6).

Figure 21:
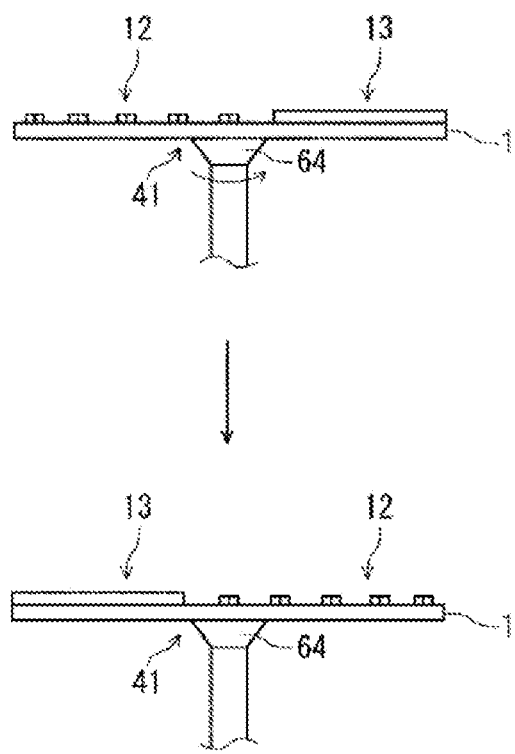
FIG. 21 is a view illustrating the measuring sequence by the sensor wafer.

The transfer arm A3 transfers the sensor wafer 1 to the resist coating module 61, which is set to change the direction of the sensor wafer 1. The stage 64 with the sensor wafer 1 loaded is rotated 180 degrees as shown in FIG. 21, so that the direction of the sensor wafer 1 is changed (Step S7). After the sensor wafer 1 with its direction changed is delivered to the transfer arm A3, the sensor wafer 1 is transferred to the heating module 71 again. In a similar way to the aforementioned Steps S4 and S5, if the loading signal is transmitted to the control unit 5, the storage of the voltages Vx and Vy in the first memory 55 is resumed (Step S8).

In this case, since the direction of the sensor wafer 1 is changed in the resist coating module 61, the wafer W with its direction changed 180 degrees from the first measurement is loaded onto the heating plate 73, as shown in FIG. 11. Therefore, even in the second measurement, the gas flow toward the sensor-pair disposing region 12 flows straight to the exhaust holes 77 without colliding with the respective components of the component disposing region 13. Then, in a similar way to Step S6, after the predetermined elapsed time from the transmission of the loading signal, the sensor wafer 1 is unloaded from the heating module 71 by means of the transfer arm A3, and the unloading signal is transmitted from the heating module 71 to the control unit 5. Thereafter, the storage of the voltages Vx and Vy is stopped (Step S9).

Figure 22:
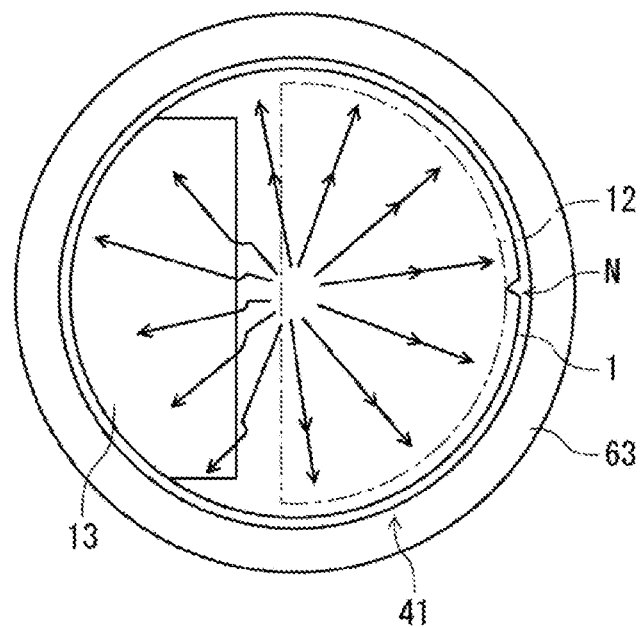
FIG. 22 is a view illustrating a gas flow on a surface of the sensor wafer.

The sensor wafer 1 is transferred to the resist coating module 61, which is set to be measured in a successive manner (Step S10). Then, in a similar way to the aforementioned Steps S4 and S5, the detection of the sensor wafer 1 and the transmission of the loading signal to the control unit 5 are sequentially performed, and the storage of the voltages Vx and Vy by the control unit 5 is initiated. In FIG. 22, the gas flow around the sensor wafer 1 in the measurement are indicated by arrows. The sensor wafer 1 loaded onto the loading unit 41 on the stage 64 in the cup 63 is supplied with the air from the ceiling, and the evacuation performed in the cup 63 causes the air to flow so that it is radially diffused from the center of the sensor wafer 1 toward the peripheral portion thereof. In this case, since the sensor-pair disposing region 12 and the component disposing region 13 are formed in different semicircular regions in the sensor wafer 1, the gas flow flowing in the sensor-pair disposing region 12 go to the peripheral portion without colliding with the components of the component disposing region 13.

Figure 23:
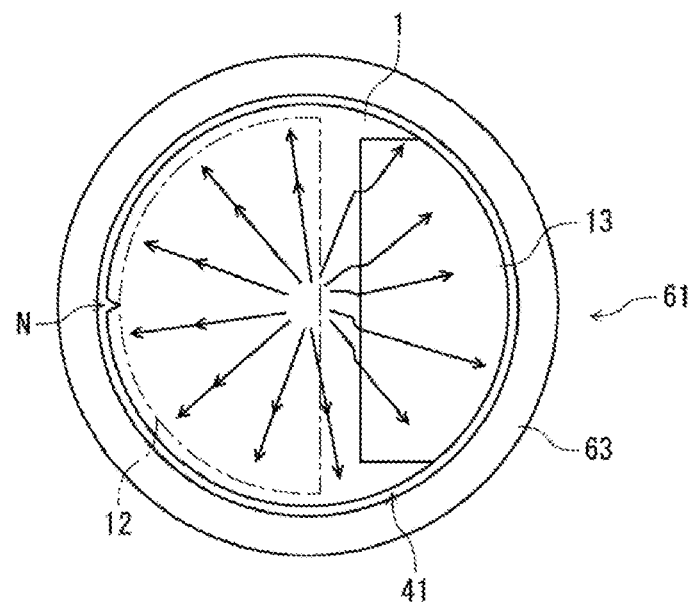
FIG. 23 is a view illustrating a gas flow on a surface of the sensor wafer.

Since the resist coating module 61 can change the direction of the sensor wafer 1, the second measurement is performed without unloading the sensor wafer 1 to the outside. For example, after a predetermined time is passed from the transmission of the loading signal, the storage of the data of the voltages Vx and Vy by the control unit 5 is stopped, and then, the stage 64 is rotated 180 degrees to change the direction of the sensor wafer 1, as shown in FIG. 23. After the direction is changed, the obtainment of the voltages Vx and Vy by the control unit 5 is resumed to perform the second measurement. Even in this case, in a similar way to the first measurement, the gas flow flowing in the sensor-pair disposing region 12 go to the peripheral portion of the sensor wafer 1 without colliding with the components of the component disposing region 13 as shown by arrows in FIG. 23.

Thereafter, in a similar way to Step S9, the unloading of the sensor wafer 1 by means of the transfer arm A3 and the transmission of the unloading signal from the resist coating module 61 are sequentially performed, and then, the storage of the voltages Vx and Vy is stopped. Then, for example, the sensor wafer 1 is transferred in the order of the transfer arm A3, the transfer module TRS of the tower T1, and the transfer and mounting mechanism 43 and then returns to the carrier C. After the voltages Vx and Vy of the respective modules are obtained, the user designates a module of which a distribution of gas flow directions and speeds is to be displayed, and the image thereof is displayed as shown in FIG. 14.

Although the gas flow measurement of the heating module 71 and the resist coating module 61 has been described as a representative, for example, for the measurement on a module, such as a transfer module TRS, which does not have a function of changing a direction of a wafer W, is performed in a similar way to the measurement on the heating module 71. Also, the measurement on a module having a function of changing a direction of a wafer W, such as the periphery exposure module 65 or the developing module, is performed in a similar way to the measurement on the resist coating module 61. In addition, the loading unit 41 is not limited to a loading unit 41 of a module, but includes a loading unit of a wafer transfer mechanism, such as the transfer arm A. That is, the measurement is performed in a state where the transfer mechanism holds and supports the sensor wafer 1, so that a distribution of gas flow directions and speeds in the transfer region of a wafer W can be measured. Even in this case, in a similar way to the gas flow measurement on the heating module 71, the direction of the sensor wafer 1 is changed in the resist coating module 61 or the like between the first measurement and the second measurement.

Since the aforementioned sensor wafer 1 is configured to be automatically transferred between the modules in the coating and developing device 4 in the same way as the wafer W and to obtain data, the process becomes more convenient. More specifically, as compared with the configuration that the control unit 5 and the sensor wafer 1 are connected with a data transmission wire, it is possible to save the trouble necessary for transferring the sensor wafer 1. Thus, for example, the trouble that in order to dispose the wire between the interior and the exterior of the module, components of the module are removed or the like is omitted. In addition, there is an effect in that an influence of the wire on gas flow in a module can be reduced.

In addition, the sensor wafer 1 is divided into the two semicircular regions, which are referred to as the sensor-pair disposing region 12 and the component disposing region 13, respectively, and the measurement is performed twice while changing the direction of the sensor wafer 1 as described above. Thus, the gas flow flowing on the surface of the sensor-pair disposing region 12 can be prevented from colliding with the component groups in the component disposing region 13 and thus generating turbulence. Accordingly, it is possible to increase the accuracy of the measurement of gas flow directions and speeds. Also, since such layout causes the necessity for reducing the influence on gas flow in the sensor-pair disposing region 12, for example by burying the respective components in the substrate main body 11, to be removed, the degree of freedom in shape and size of components can be increased to reduce manufacturing costs of the sensor wafer 1. Also, it is possible to prevent the deterioration of the measurement accuracy, which is caused by the thickness of the sensor wafer 1 larger than that of the wafer W for the burial of the components, i.e., a disjunction between the shape of the sensor wafer 1 and the shape of the wafer W. However, it is not that such components are prohibited from being buried in the substrate main body 11 of the sensor wafer 1.

Figure 24:
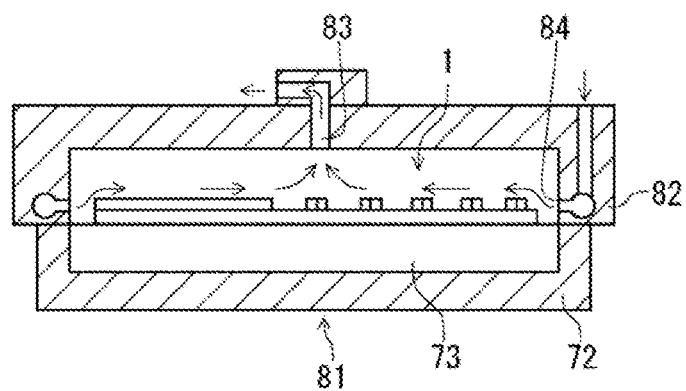
FIG. 24 is a view illustrating measurement in another heating module.

In the aforementioned examples, the exemplary measurements on the module in which gas flow directed from one end of the surface of the wafer W toward the other end are generated and the module in which gas flow directed from the center toward the peripheral portion are generated have been described. However, the measurement may be performed on modules in which the gas flow in a different direction from the above are generated. FIG. 24 shows a heating module 81 having a different configuration. A lid 82 is provided to surround an upper portion of the heating plate 73, and an exhaust hole 83 is formed in the center of a ceiling of the lid 82. Gas supply holes 84 are formed in an inner periphery of the lid 82 to surround the heating plate 73, and the gas flow which flows from the peripheral portion of the heating plate 73 toward the center thereof are generated to be approximately symmetric in directions toward the periphery from the center of the wafer W.

Since the gas flow is generated as above, contrary to the measurement of gas flow in the heating module 71, the sensor wafer 1 may be loaded onto the heating plate 73 in an arbitrary direction in a similar way to the measurement of gas flow in the resist coating module 61. Also, in the heating module 81, even when the exhaust hole 83 and the gas supply holes 84 respectively serve as a gas supply hole and exhaust holes and the gas flow directed from the center of the sensor wafer 1 toward the peripheral portion is measured, the measurement can also be performed by means of the sensor wafer 1.

Second Embodiment

Figure 25:
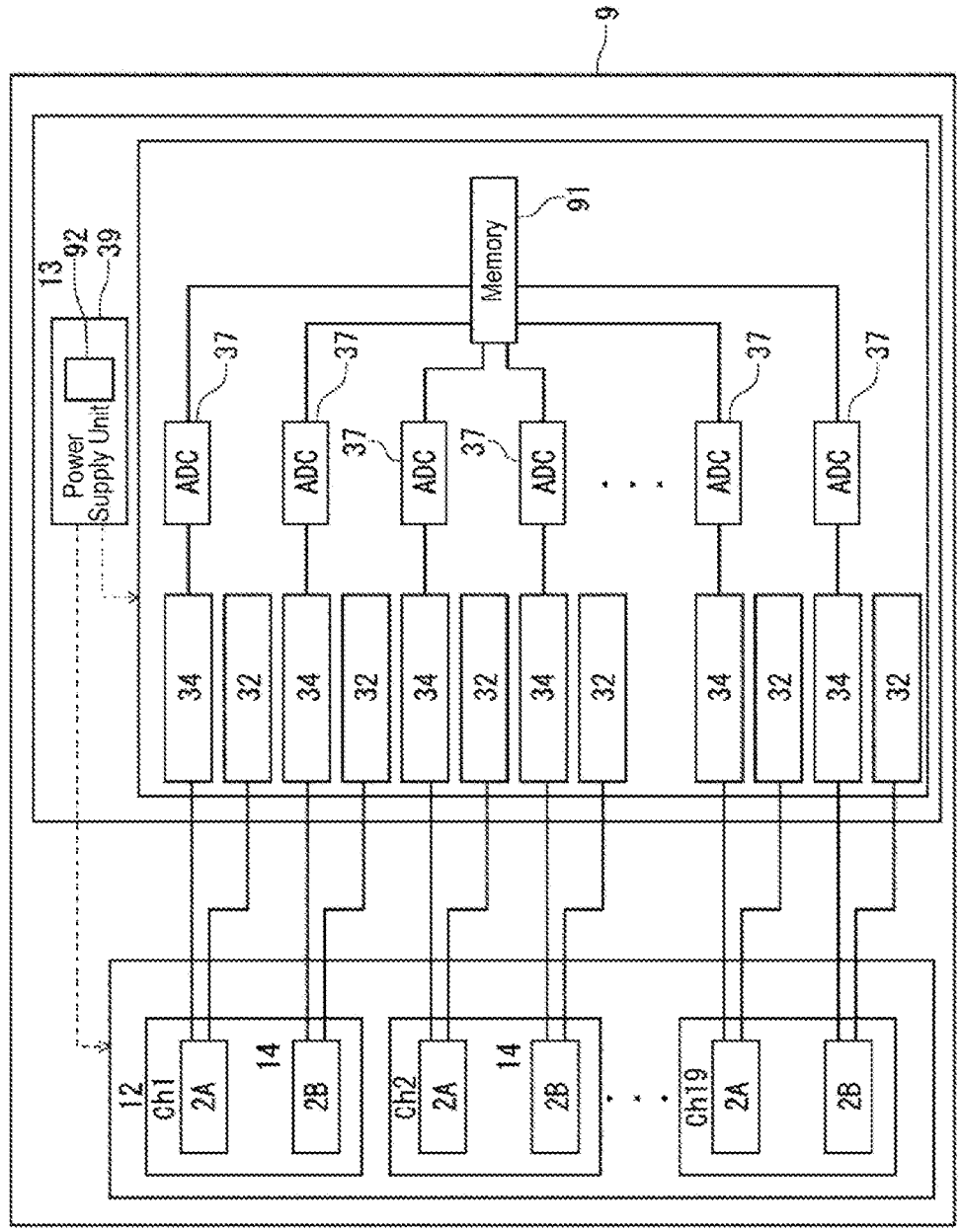
FIG. 25 is a block diagram showing the configuration of another sensor wafer.

FIG. 25 shows the schematic configuration of a sensor wafer 9 of a second embodiment. Differences from the first embodiment will be described as follows. The sensor wafer 9 is not provided with the wireless transmission unit 38, and the data output from the ADC 37 are stored in a memory 91, which for example, is detachably installed to the component disposing region 13. In addition, the power supply unit 39 is provided with a switch 92. The switch 92 allows the supply of power from the power supply unit 39 to different components of the component disposing region 13 and the pairs of sensors 14 to be manually switched on and off. An example of the measurement using the sensor wafer 9 will be described. For example, a partition wall 93, which divides the inside of the resist coating module 61 and the protective film forming module 62 from the outside of the coating and developing device 4 shown in FIG. 15, is removed, and a user instructs the control unit 5 to make the transfer arm A3 enter the resist coating module 61 or the protective film forming module 62. Then, the user turns on the switch 92, and the sensor wafer 9 is delivered from the outside of the coating and developing device 4 to the transfer arm A3 through the opening portion formed by the removal of the partition wall 93. Then, a transfer path of the sensor wafer 9 is set through the control unit 5, and the sensor wafer 9 is transferred to the desired module. After the transfer to the module, the measurements are performed in different directions of the sensor wafer 9 for each measurement, in a similar way to the first embodiment.

After the measurement is ended, the sensor wafer 9 is transferred to the resist coating module 61 and the protective film forming module 62, and the user withdraws the sensor wafer 9 through the opening portion and turns off the switch 92. Then, a computer is allowed to read the data from the memory 91, the data obtained at the time when the sensor wafer 9 is loaded into the module are extracted from time series data of the voltages Vx and Vy, displaying a distribution of gas flow directions and speeds on the display screen, in a similar way to the first embodiment. Even in this second embodiment, the same effects as the first embodiment are obtained. In addition, the memory 91 may be applied to the first embodiment to obtain data as a backup.

Figure 26:
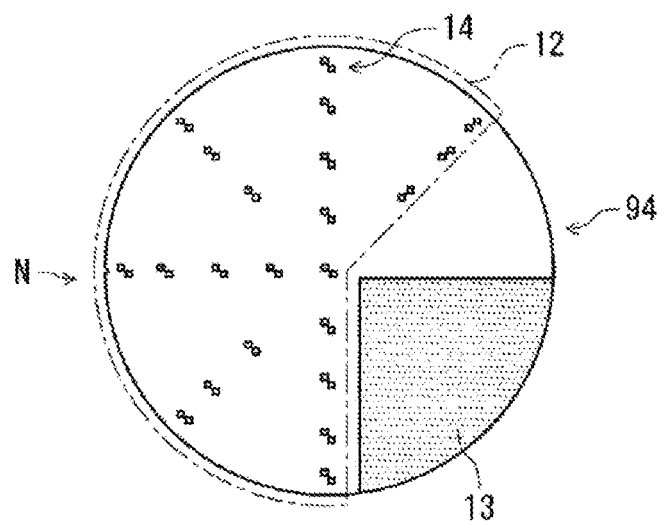
FIG. 26 is a schematic plane view showing another example of the sensor wafer.
Figure 27:
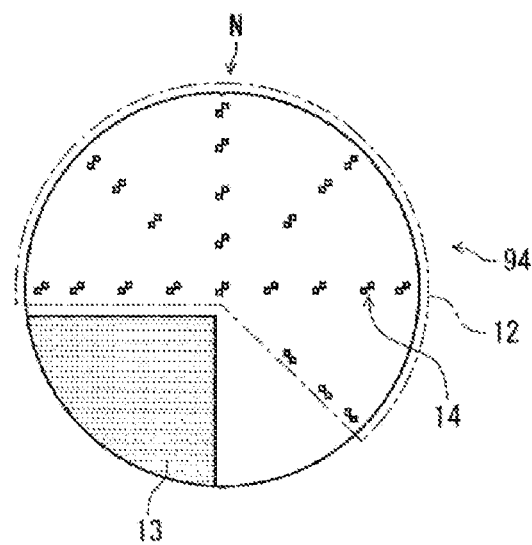
FIG. 27 is a schematic plane view showing the other example of the sensor wafer.

However, the layout of the sensor-pair disposing region 12 and component disposing region 13 is not limited to the above example. For example, a sensor wafer 94 shown in FIG. 26 is configured so that the component disposing region 13 has a fan shape having a central angle of 90 degrees. In addition, the sensor-pair disposing region 12 has a fan shape having a central angle of approximately 225 degrees. In the respective figures after FIG. 26, a plurality of dots is provided to the component disposing region 13 for clearness in illustration. FIG. 26 shows a direction of the sensor wafer 94 in the first measurement, while FIG. 27 shows a direction of the sensor wafer 94 in the second measurement. In order to change the direction of the sensor wafer 94, the sensor wafer 94 is rotated at an angle so that the gas flow directions and speeds at places in which the component disposing region 13 is positioned in the first measurement may be obtained in the second measurement, in a similar way to the first embodiment. In this example, the sensor wafer 94 is rotated 90 degrees.

In more detail, in this example, the gas flow of respective portions on radiuses extending in eight directions from the center of the loading unit 41 of the wafer W are measured, and the radiuses are equiangularly set in the circumferential direction of the loading unit 41, in a similar way to the first embodiment. In the sensor wafer 94, pairs of the sensors 14 are arranged to extend in six directions from the center of the sensor wafer 94 along the radiuses to constitute the aforementioned, fan-shaped sensor-pair disposing region 12, and the radiuses on which the pairs of sensors 14 are arranged are equiangularly set in the circumferential direction of the fan shape. In the first measurement shown in FIG. 26, the gas flow is measured at the portions on the radiuses extending from the center of the loading unit 41 in the six of the eight directions. Then, in the second measurement shown in FIG. 27, the gas flow is measured at the portions on the radiuses in the six directions including the other two of the eight directions in which the measurement cannot be performed in the first measurement.

In the sensor wafer 94 shown in FIGS. 26 and 27, since the fan shape of the component disposing region 13 has a central angle of 180 degrees or less, when the component disposing region 13 is disposed in one side of the left and right sides as viewed from the opening portion 78 toward the exhaust holes 77 in the heating module 71, the gas flow directed toward the pairs of sensors 14 disposed in the other side in the sensor-pair disposing region 12 does not collide with the component disposing region 13. In addition, even when the sensor wafer 94 is used in a module, such as the resist coating module 61 or the heating module 81, in which gas flow diffused from the center of the loading unit 41 toward the peripheral portion thereof or gas flow collected at the center from the peripheral portion are generated, the gas flow flowing in the sensor-pair disposing region 12 do not collide with the component disposing region 13. Therefore, according to the sensor wafer 94 shown in FIGS. 26 and 27, in a similar way to the sensor wafer 1, it is possible to obtain the gas flow data with high accuracy in the resist coating module 61 and the heating module 71 and 81.

Figure 28:
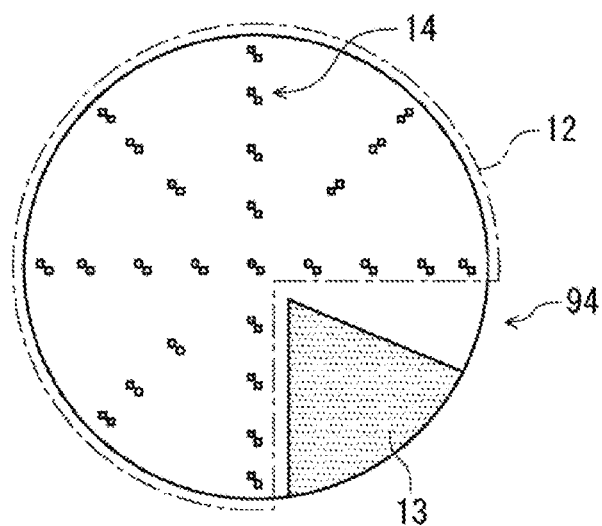
FIG. 28 is a schematic plane view showing still another example of the sensor wafer.
Figure 29:
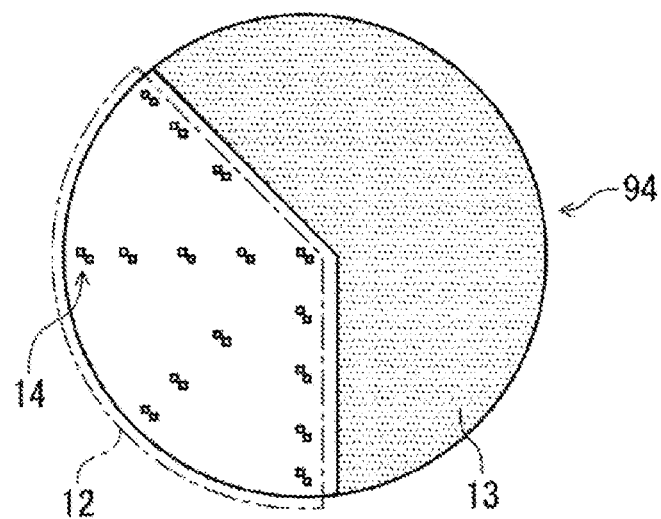
FIG. 29 is a schematic plane view showing still another example of the sensor wafer.

As shown in FIG. 28, the component disposing region 13 may be configured in the shape of a fan having a central angle of 90 degrees or less. In a similar way to the sensor wafer 94 shown in FIGS. 26 and 27, even when the sensor wafer 94 of FIG. 28 is used, it is possible to measure the gas flow in the resist coating module 61 or the heating module 71 or 81 with high accuracy. In addition, as shown in FIG. 29, the component disposing region 13 may be configured in the shape of a fan having a central angle of 180 degrees or more. When gas flow diffused from the center of the loading unit 41 toward the peripheral portion thereof or collected at the center from the peripheral portion is measured, the component disposing region 13 does not block the gas flow directed toward the pairs of sensors 14. Therefore, such a configuration makes it possible to obtain the gas flow data having high accuracy. However, if the central angle of the component disposing region 13 is larger than 180 degrees, when the measurement is performed on a module, such as the heating module 71, in which gas flow directed from one end of a wafer W toward the other end is generated, the gas flow directed toward the sensor-pair disposing region 12 is blocked by the component disposing region 13. Thus, it is preferred that a fan shape of the component disposing region 13 have a central angle of 180 degrees or less.

Figure 30:
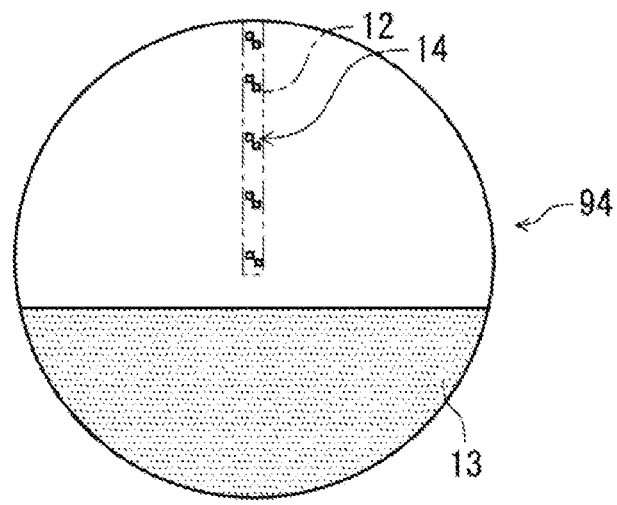
FIG. 30 is a schematic plane view showing still another example of the sensor wafer.
Figure 31:
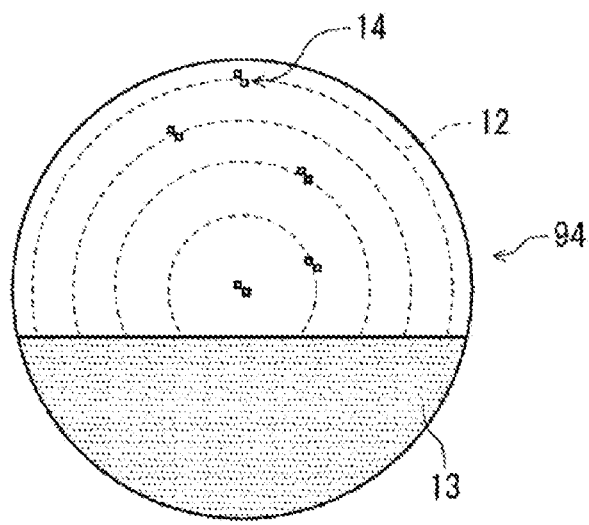
FIG. 31 is a schematic plane view showing still another example of the sensor wafer.

In addition, another example of the sensor wafer 94 for measuring gas flow diffused from the center of the loading unit 41 toward the peripheral portion thereof or collected at the center from the peripheral portion is illustrated in FIGS. 30 and 31. As shown in FIG. 30, plural pairs of sensors 14 are disposed only in one radial direction, so that the measurement of the gas flow directions and speeds may be performed at a plurality of respective portions of the loading unit 41 by performing a plurality of measurements while changing the direction of the sensor wafer 94. Also, if the pairs of sensors 14 are disposed at different positions from the center toward the peripheral portion, the measurement may be performed at a plurality of respective portions of the loading unit 41 by changing the direction the sensor wafer 94. Accordingly, for example, as shown in FIG. 31, pairs of sensors 14 may be disposed to be dislocated from each other in the circumferential direction. In the figure, dotted lines are imaginary lines along the circumferential direction. Even though the pairs of sensors 14 are disposed in the same manner as shown in FIGS. 30 and 31, the gas flow around the pairs of sensors 14 flows without being blocked by the component disposing region 13 in the respective measurement, thereby obtaining measurement data with high accuracy.

Figure 32:
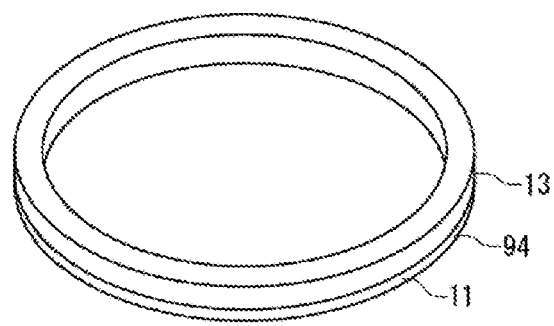
FIG. 32 is a perspective view of a back side of still another example of the sensor wafer.
Figure 33:
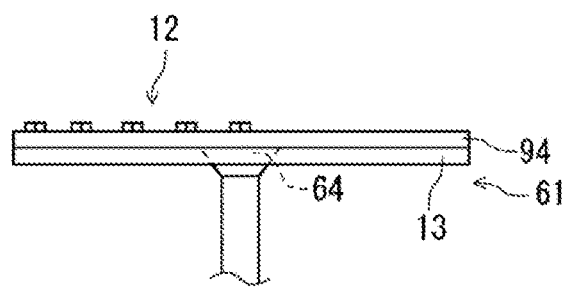
FIG. 33 is a view illustrating a state of measurement by the other example of the sensor wafer.

Also, FIG. 32 shows a back side of another example of the sensor wafer 94. In this example, the component disposing region 13 is formed in the shape of a ring on the peripheral portion of the back side of the sensor wafer 94. As shown in FIG. 33, the component disposing region 13 is formed outside of a holding and support region for the stage 64 of the resist coating module 61. Accordingly, since the substrate main body 11 of the sensor wafer 94 is held at the same position as the wafer W, a width of a layout of the pairs of sensors 14 can be enlarged and also the measurement with high accuracy can be performed. However, when the sensor wafer 94 is loaded onto the heating plate 73 of the heating module 71, a position in which the substrate main body 11 is loaded is higher than that of the wafer W. Thus, it is advantageous that the component disposing region 13 is provided in the surface of the sensor wafer 94 in the same way as the other examples.

Although in the aforementioned examples, the direction of the sensor wafer 1 is adjusted so that the sensor-pair disposing region 12 and the component disposing region 13 of the sensor wafer 1 are arranged in the left and right sides with respect to the gas flow when the sensor wafer 1 is transferred to the heating module 71 using the periphery exposure module 65, the adjustment of the direction of the sensor wafer 1 is not limited thereto. For example, the sensor wafer 1 is accommodated in the carrier C so that the sensor wafer 1 is disposed in such a direction in advance when the sensor wafer 1 is transferred to the heating module 71, and in such a state, the carrier C may be transferred to the coating and developing device 4. For example, the carrier C is provided with a rotatable stage and an optical sensor, which are installed to the periphery exposure module 65, and the sensor wafer 1 may be adjusted in its direction and then transferred to the designated module. The optical sensor may be installed to a module, in which the stage 64 is provided and a liquid treatment is performed in the coating and developing device 4, such as the resist coating module 61, the protective film forming module 62 or the developing module, thereby adjusting the direction of the sensor wafer 1 in that manner.

In addition, the present disclosure is not limited to that the sensor wafer 1 is accommodated in the carrier C, and for example, the sensor wafer 1 may be accommodated in the coating and developing device 4. For example, an accommodation unit of the sensor wafer 1 may be provided in a region accessible to the transfer and mounting mechanism 43. In addition, during the processing of the wafer W, the accommodation unit supplies power to the power supply unit 39 of the sensor wafer 1 with or without wire, so that a battery constituting the power supply unit 39 may be allowed to be charged. Also, instead of providing the power supply unit 39 to supply power to different components, a jig for wirelessly supplying power having the same shape as the wafer W is transferred in the vicinity of the sensor wafer 1 when the measurement is performed, thereby wirelessly supplying power to the sensor wafer 1. In the aforementioned examples, during the measurement, the exhaust amount and the supply amount of gas in respective portions in the coating and developing device 4 is not changed before and after the sensor wafer 1 is loaded. However, if the sensor of the module detects the sensor wafer 1, the amounts may be allowed to be changed from their initial values to predetermined values. Also, although the loading unit 41 is measured once per a half surface in the aforementioned examples, the measurement on a half surface may be performed plural times and an average value of all the measurement results may be calculated, thereby obtaining a distribution of gas flow directions and speeds of respective portions. Although the gas flow directions and speeds have been calculated, only the gas flow directions may be calculated and displayed.

<Evaluation Test 1>

A test for evaluating an influence of the component disposing region 13 on gas flow in the sensor-pair disposing region 12 was performed. In this test, like the heating module 71, an evaluation apparatus for generating the gas flow directed from one end of the wafer W loaded onto the loading unit 41 toward the other end was prepared. In a similar way as the measurement of the heating module 71, the sensor wafer 1 was disposed so that the sensor-pair disposing region 12 and the component disposing region 13 were arranged in the left and right sides as viewed from an exhaust hole of the apparatus toward an air supply hole, and the gas flow speeds detected in the respective gas flow speed sensors 2A and 2B of Ch1 to Ch3, Ch5, and Ch7 to Ch9 disposed along the component disposing region 13 were evaluated. The component disposing region 13 in the substrate main body 11 is dislocated whenever the measurement was performed, so that the spacing distance L1 spaced apart from the pairs of sensors 14 shown in FIG. 1 was changed. In addition, as a reference jig, a wafer having the same configuration as the sensor wafer 1, except that each component of the component disposing region 13 was formed in a position withdrawn and spaced apart from the substrate main body 11 by a cable, was prepared, and the measurement was performed in the same manner.

Here, the test was successful when a difference between a gas flow speed of each channel of the reference jig and a gas flow speed of each channel of the sensor wafer 1 was in a range of 0.01 m/s. When the spacing distance L1 in the sensor wafer 1 was 70 mm or less, there was a channel out of the permissible range. However, when the spacing distance L1 in was 80 mm, the difference in gas flow speed in every channel was in the permissible range. Also, if the gas flow speed was set to 0.1 m/s, 0.2 m/s, and 0.3 m/s in the evaluation apparatus, but the spacing distance L1 was set to 80 mm, a gas flow speed of any value was in the permissible range.

<Evaluation Test 2>

The heating module 81 illustrated in the embodiments was used instead of the evaluation apparatus, and the sensor wafer 1 having the spacing distance L1 set to 80 mm and the reference jig were used to perform the test in the same way as Evaluation Test 1. In the heating module 81, the supply amount of gas was set to 4.0 L/min. As a result, the difference in the gas flow speed in every channel of the sensor wafer 1 was in the permissible range. That is, it was found from these tests that even though the component disposing region 13 was provided on the substrate main body 11, it is possible to prevent an influence of the components in the component disposing region 13 on gas flow around the pairs of sensors 14 by adjusting the distance between the sensor-pair disposing region 12 and the component disposing region 13.

According to the present disclosure, a sensor substrate, in which plural pairs of sensors consisting of first and second sensors for obtaining data of gas flow vectors are provided at different distances from each other as viewed from the center of a surface of the sensor substrate, is loaded onto a substrate loading unit in a first direction, and then, a position of the sensor substrate is changed about the center into a second direction. When the measurements are performed in the first and second directions, components of a gas flow vector obtained from each pair of sensors are combined based on a predetermined starting point for each pair of sensors and data of gas flow directions in the first and second measurement regions are obtained. Accordingly, even though the positions in which the sensors can be disposed are limited in the sensor substrate, gas flow directions of respective portions of the substrate can be measured with high accuracy.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method for obtaining data on gas flow directions in a plurality of measurement regions in a surface of a substrate loaded onto a loading unit of a substrate processing apparatus, the method comprising:
    loading a sensor substrate onto the loading unit in a first direction for obtaining data of gas flow directions in a first measurement region of a surface of the substrate, wherein the sensor substrate includes plural pairs of sensors provided at different distances from each other as viewed from a center of the surface, and wherein each pair of the sensors includes first and second sensors for obtaining vector data of a gas flow;
    changing the direction of the sensor substrate on the loading unit into a second direction to obtain data of gas flow directions in a second measurement region, wherein the second measurement region is separate from the first measurement region around the center of the substrate;
    obtaining vector data of a gas flow in a first straight direction from each first sensor of the sensor substrate loaded in the first and second directions, wherein the first straight direction is set along the surface of the sensor substrate for the first sensor;
    obtaining vector data of a gas flow in a second straight direction from each second sensor of the sensor substrate loaded in the first and second directions, wherein the second straight direction is set along the surface of the sensor substrate for the second sensor, and wherein the second straight direction makes an angle with the first straight direction set for the first sensor which makes a pair with the second sensor; and
    calculating a gas flow direction at each starting point in the first and second measurement regions by combining the vector data of the gas flow vector obtained from the first and second sensors which makes a pair with each other based on a predetermined starting point for the pair of the sensors.

2. The method of claim 1, wherein a sensor-pair disposing region having the pairs of sensors provided therein and a component disposing region provided in a position dislocated in a circumferential direction of the sensor substrate are formed in the surface of the sensor substrate, and
    wherein the component disposing region comprises at least one of a transmission unit configured to wirelessly transmit the vector data of gas flow vectors obtained from the first and second sensors to the outside of the sensor substrate and a memory configured to store the vector data.

3. The method of claim 2, wherein the sensor-pair disposing region and the component disposing region are formed in left and right sides of the sensor substrate, respectively.

4. The method of claim 3, wherein the substrate processing apparatus is provided with a supply hole of gas and an exhaust hole of gas between which the loading unit is interposed, and
    wherein loading the sensor substrate in the first and second directions comprises loading the sensor substrate so that the sensor-pair disposing region and the component disposing region are respectively disposed in left and right sides as viewed from the supply hole toward the exhaust hole.

5. The method of claim 4, wherein the vector data corresponds to gas flow speeds, and
    wherein the method further comprises calculating a gas flow speed at the starting point by combining the vector data based on a predetermined starting point for each pair of the sensors.

6. The method of claim 5, wherein the angle between the first straight direction and the second straight direction is 90 degrees.

7. The method of claim 4, wherein the angle between the first straight direction and the second straight direction is 90 degrees.

8. The method of claim 3, wherein the vector data corresponds to gas flow speeds, and
    wherein the method comprises calculating a gas flow speed at the starting point by combining the vector data based on a predetermined starting point for each pair of the sensors.

9. The method of claim 8, wherein the angle between the first straight direction and the second straight direction is 90 degrees.

10. The method of claim 3, wherein the angle between the first straight direction and the second straight direction is 90 degrees.

11. The method of claim 2, wherein the vector data corresponds to gas flow speeds, and
    wherein the method comprises calculating a gas flow speed at the starting point by combining the vector data based on a predetermined starting point for each pair of the sensors.

12. The method of claim 11, wherein the angle between the first straight direction and the second straight direction is 90 degrees.

13. The method of claim 2, wherein the angle between the first straight direction and the second straight direction is 90 degrees.

14. The method of claim 1, wherein the vector data corresponds to gas flow speeds, and wherein the method comprises calculating a gas flow speed at the starting point by combining the vector data based on a predetermined starting point for each pair of the sensors.

15. The method of claim 14, wherein the angle between the first straight direction and the second straight direction is 90 degrees.

16. The method of claim 1, wherein the angle between the first straight direction and the second straight direction is 90 degrees.

17. A sensor substrate configured to obtain data on gas flow directions in a plurality of measurement regions in a surface of a substrate loaded onto a loading unit of a substrate processing apparatus, the sensor substrate comprising:
   a plurality of first sensors configured to obtain vector data of gas flow in a first straight direction set along a surface of the sensor substrate;
   a plurality of second sensors configured to obtain vector data of gas flow in a second straight direction set to make an angle with the first straight direction along the surface of the sensor substrate, wherein each of the second sensors makes a pair with each of the first sensors, and wherein the pairs of sensors are respectively provided at different distances as viewed from the center of the surface; and
   at least one of a transmission unit configured to wirelessly transmit the vector data obtained from the first and second sensors to the outside of the sensor substrate and a memory configured to store the data to calculate a gas flow direction at each starting point by combining the vector data of the gas flow vector obtained from the first and second sensors which makes a pair with each other based on a predetermined starting point for the pair of the sensors.

18. The sensor substrate of claim 17, wherein a sensor-pair disposing region having the pairs of sensors provided therein and a component disposing region having the transmission unit or the memory provided therein are provided in positions dislocated from each other in a circumferential direction in the surface of the sensor substrate.

19. The sensor substrate of claim 18, wherein the sensor-pair disposing region and the component disposing region are formed in left and right sides of the sensor substrate, respectively.

* * * * *